(12) United States Patent
Novo Vidal

(10) Patent No.: US 7,425,772 B2
(45) Date of Patent: Sep. 16, 2008

(54) ELECTRIC POWER GENERATING SYSTEM USING RING-SHAPED GENERATORS

(76) Inventor: Maria Elena Novo Vidal, Taramuño 46 San Vicente de Vigo, 14175 Carral (A Coruña) (ES)

( * ) Notice: Subject to any disclaimer, the term of this patent is extended or adjusted under 35 U.S.C. 154(b) by 0 days.

(21) Appl. No.: 11/973,801

(22) Filed: Oct. 10, 2007

(65) Prior Publication Data

US 2008/0088135 A1   Apr. 17, 2008

Related U.S. Application Data

(63) Continuation of application No. PCT/ES2006/000182, filed on Apr. 11, 2006.

(30) Foreign Application Priority Data

| Apr. 11, 2005 | (ES) | 200500894 |
| Apr. 18, 2005 | (ES) | 200500984 |
| Mar. 27, 2006 | (ES) | 200600886 |

(51) Int. Cl.
  *F03B 13/00* (2006.01)
  *H02K 1/22* (2006.01)
(52) U.S. Cl. .......... 290/52; 290/55; 310/268; 310/178
(58) Field of Classification Search ............ 290/43, 290/44, 49, 52, 54, 55; 310/178, 113, 268
  See application file for complete search history.

(56) References Cited

U.S. PATENT DOCUMENTS

| 4,318,019 A | 3/1982 | Teasley et al. | |
| 4,520,273 A | 5/1985 | Rowe | |
| 4,720,640 A * | 1/1988 | Anderson et al. | 290/43 |
| 5,315,159 A * | 5/1994 | Gribnau | 290/55 |
| 5,735,665 A | 4/1998 | Kang | |
| 6,750,588 B1 * | 6/2004 | Gabrys | 310/268 |
| 6,849,965 B2 * | 2/2005 | Le Nabour et al. | 290/55 |
| 6,952,058 B2 * | 10/2005 | McCoin | 290/44 |
| 7,042,109 B2 * | 5/2006 | Gabrys | 290/44 |
| 7,154,191 B2 * | 12/2006 | Jansen et al. | 290/55 |
| 7,190,087 B2 * | 3/2007 | Williams | 290/53 |
| 7,215,038 B2 * | 5/2007 | Bacon | 290/55 |
| 7,218,011 B2 * | 5/2007 | Hiel et al. | 290/43 |
| 2004/0201299 A1 | 10/2004 | Naritomi et al. | |

FOREIGN PATENT DOCUMENTS

CA   2421139   9/2004

(Continued)

*Primary Examiner*—Nicholas Ponomarenko

(57) ABSTRACT

Electric power generator system using ring-shaped generators and essentially being formed of turbines and generators, and optionally converging-diverging nozzles. The turbines may optionally have an open center, and may be of any type, such as axial turbines, reel-shaped turbines, cycloidal turbines optionally with an annulus, helix shaped turbines, etc. In addition, the blades of the turbines may or not be curved and/or articulated. The generators can be of permanent magnets or variable reluctance, non-watertight and optionally independent. The exciter can be made of a ring (of magnets, or of areas having alternately high and low magnetic permeability) around the blades, and the armature (magnets with windings, or coils with a high-permeability core, depending on the case) forming an arc or ring fitted in the housing or the nozzle and/or the stationary inner cylinder or ring (or braced ring system) in the case of open-center turbines.

16 Claims, 22 Drawing Sheets

FOREIGN PATENT DOCUMENTS

| | | |
|---|---|---|
| DE | 199 08 557 | 9/1999 |
| ES | 2191571 | 9/2003 |
| GB | 2 190 144 | 11/1987 |
| GB | 2 205 615 | 12/1988 |
| JP | 59120783 | 7/1984 |
| WO | WO 0148374 | 7/2001 |
| WO | WO 2004/074680 | 9/2004 |

* cited by examiner

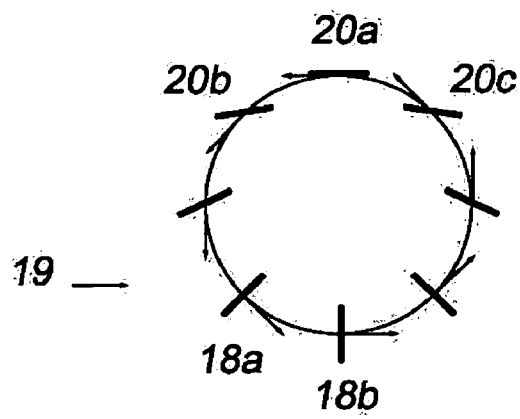
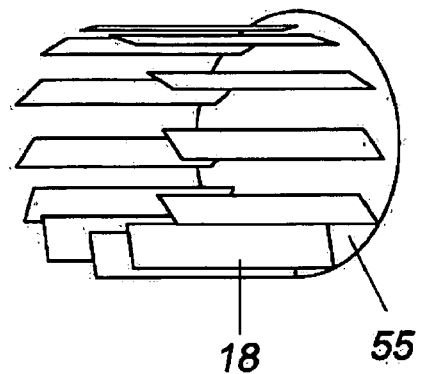
FIG. 20   FIG. 21
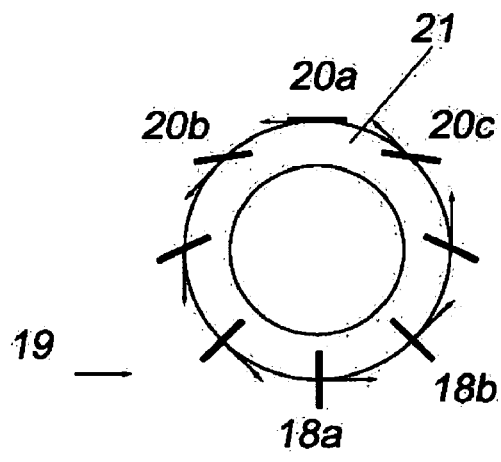
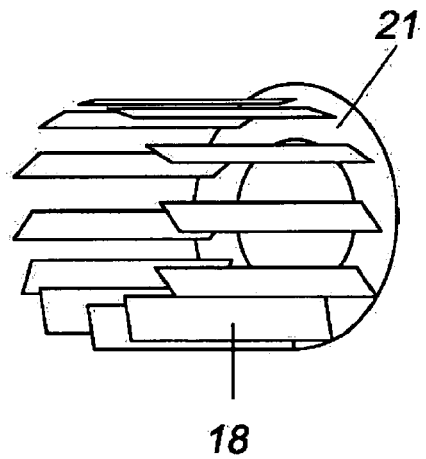
FIG. 22   FIG. 23

ELECTRIC POWER GENERATING SYSTEM USING RING-SHAPED GENERATORS

CROSS REFERENCE TO RELATED APPLICATIONS

This application is a continuation under 35 U.S.C. 120 of International Application No. PCT/ES2006/000182, filed on Apr. 11, 2006, which claims priority from Spanish Application No. P 200500894, filed on Apr. 11, 2005, Spanish Application No. P 200500984, filed on Apr. 18, 2005, and Spanish Application No. P 200600886, filed on Mar. 27, 2006.

In the present invention a new method is proposed for transforming the kinetic energy of a fluid in motion into electrical energy using for that various types of turbine, especially those with an open center, and various types of non-watertight generators, magnetoelectric or variable reluctance, especially those installed in the form of a ring (although independent generators could also be used). Nozzles, preferable convergent-divergent can be used as well. All of this is as explained in the following.

Although in general they could be used with any type of fluid in motion, they are especially designed for cases where it is wished to obtain electrical energy from large masses of moving water, as is the case with the manne currents, since there is a large quantity of kinetic energy in them that can easily be transformed into electrical energy. All of it is in a clean form, without any harmful environmental impact, that is to say, completely without damage to the fauna of the area, without spoiling the landscape, without generating residues not producing contamination. Furthermore, it is a goal to achieve a low cost of fabrication and maintenance, to obtain electrical energy at competitive prices compared to those of energy obtained from fossil fuels, contributing to which is the additional fact that they do not need any expenditure on fuel for their operation, since marine and river currents move naturally. There is no need either to construct dams, breakwaters, reservoirs or fluid diversion systems. The entire control of the system can be performed from terra firma and the incidental maintenance could even be done from the surface. As the equipment is submerged in the case of marine currents, it is barely affected by storms (which could destroy or damage systems for obtaining energy from waves).

It is also proposed to use the generated energy to obtain hydrogen from water, and this could be done even in its place of installation (which can be in the middle of the sea, close to or far from the coast), therefore, a method is proposed in parallel for obtaining hydrogen at competitive prices. The energy obtained could be used as well for the desalination of sea water.

To obtain energy from ocean currents it is enough to submerge a conveniently orientated hydraulic turbine in them which drives an electric generator. It is proposed to use non-watertight generators, with a fixed armature and moving exciter to solve the main problem which usually occurs when wishing to obtain electrical energy from marine and river currents, which is that the water could ruin delicate components of the mechanism, due to the difficulty entailed in obtaining an adequate insulation of the electrical system, because the sealing of the apparatuses, especially that of the rotor shaft of the generator, is imperfect and always ends up failing. With the proposed non-watertight generators, the electrical system (both of the armature coils as well as the output terminals) is fixed, so that they will be able to be perfectly insulated. The exciter must be constituted of an element that doesn't need to make use of an electric current, which can be achieved by using rotors without windings, such as those of variable reluctance and magnetoelectric non-watertight generators. In this invention, ring-shaped generators of different geometry and layouts are also proposed, such as the ones that are going to be described.

DESCRIPTION OF THE DRAWINGS

In FIG. 12, (12) represents a slab of low density material to provide buoyancy and (13) the blade runner of the turbine. The turbines have ring-shaped generators installed (only one ring is shown), with the rotor (14) on the area of greatest radius of the blade runner, and the stator (15 and 11) on the wall of the nozzle in the area of its critical section, in FIG. 12 only in the upper part (15), and in FIG. 14 in the upper part (15) and the lower part (11).

In FIG. 16 the blades are mounted on the periphery of a cylindrical drum, while in FIG. 17 it has scoops.

FIGS. 20 and 21 represent a cycloidal turbine and FIGS. 22 and 23 a cycloidal turbine with an annulus.

FIG. 27 represents a case a) generator and FIG. 28 a case d) generator, as will be explained later on in the present document.

In FIG. 31, (1) represents the magnets and in FIGS. 32 and 33, (38) represents the pieces of high magnetic permeability with one magnet (39 in FIG. 32) or more (39 and 40 in FIG. 33) inside them; (2) represents the stator windings, (5) the teeth or portions of high magnetic permeability of the rotor and (4) the gaps or portions of low magnetic permeability of the rotor, (41) the central part, the disc or structure upon which the rotor ring with its rotary shaft (36) is mounted.

In FIGS. 39, 41, 42, 43 and 44 (51) are the braces which connect the fixed inner ring to the outer. The rotor-stator pair is installed in FIG. 39 on the area of least radius (17) of the blade runner, in FIG. 40 on the area of greatest radius (10), and in FIGS. 41, 42, 43 and 44 on both. In FIG. 43 the rim of the mouth of the nozzle (22) can be appreciated. In FIGS. 39, 40 and 41 case a) is represented, in 42 and 43 case b), in 44 case d).

RING-SHAPED GENERATORS

Figure 1:
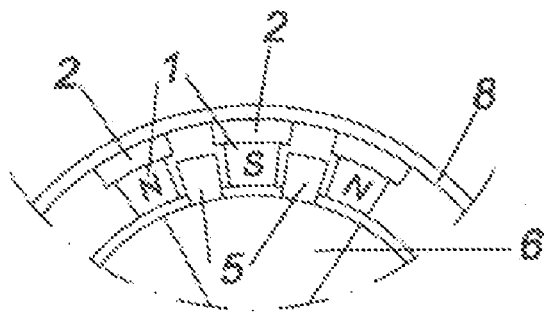
FIGS. 1 and 2 represent section views of the stator and rotor rings of a ring-shaped variable reluctance generator, mounted in this case on the area of greatest radius of the blade runner of a turbine, and in two different positions during its turn. (1) represents the magnets or pieces of high magnetic permeability (with one or more magnets inside them) and (2) the stator windings, (5) the teeth or portions of high magnetic permeability of the rotor, (6) the turbine blades and (8) the ring to which the stator magnets with their windings have been fixed.
Figure 2:
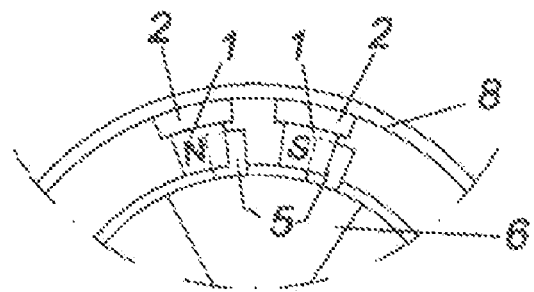
Figure 3:
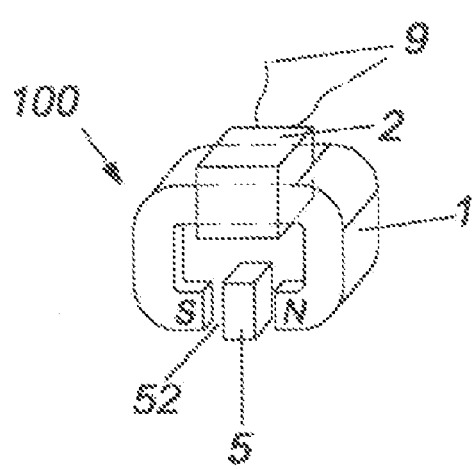
FIG. 3 represents one of the stator magnets, with reference to FIGS. 1 and 2.
Figure 4:
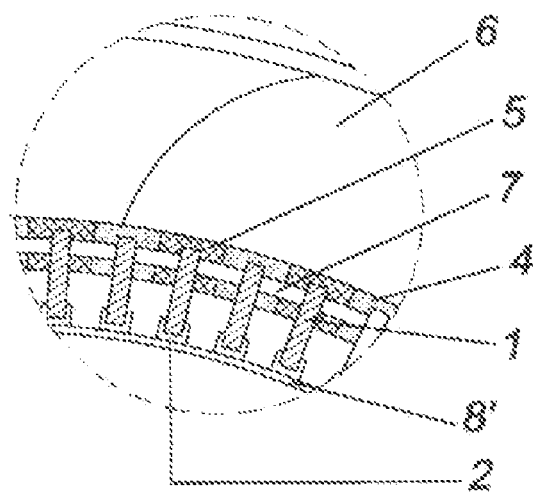
FIGS. 4 and 5 are a more detailed version of FIGS. 1 and 2 with the difference that the ring-shaped variable reluctance generator has been mounted this time on the area of least radius of the blade runner of the turbine. (1) represents the magnets or pieces of high magnetic permeability (with one or more magnets inside them) and (2) the stator windings, (5) the portions of high magnetic permeability of the rotor and (4) the portions of low magnetic permeability, (6) the turbine blades, (7) the pieces of non-magnetizable material to keep the magnets rigidly joined to each other, (3') a non-magnetizable material that fills the spaces between the magnets and (8') the ring to which the magnets with the stator windings have been fixed.
Figure 5:
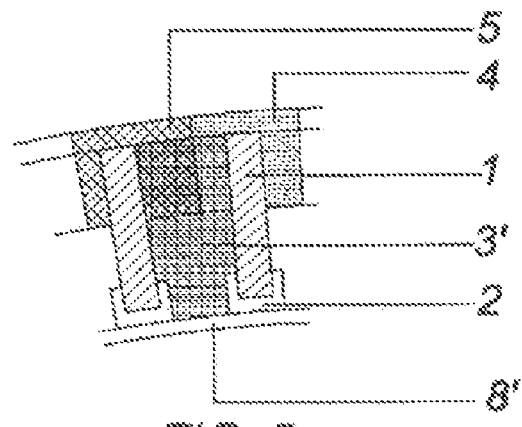
Figure 6:
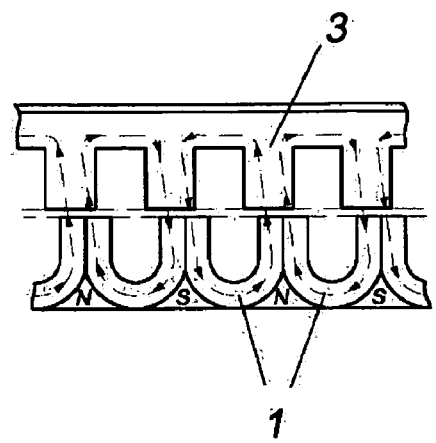
FIGS. 6, 7 and 8 represent different positions of the rotor and stator of a non-watertight ring-shaped permanent magnet generator, with the magnets joined to each other by their N poles and their S poles, forming a crown (case a, in the description). (1) are the rotor magnets, (2) the stator coils and (3) their cores.
Figure 7:
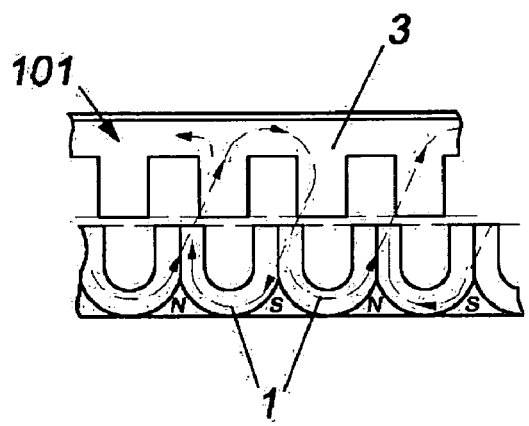
Figure 8:
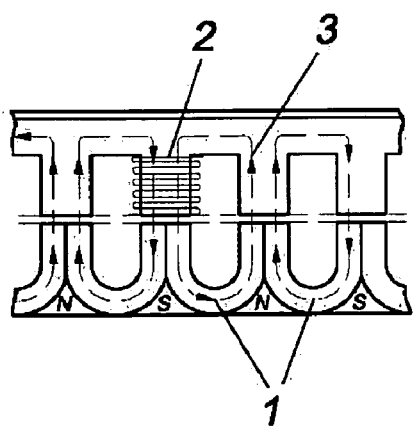
Figure 9:
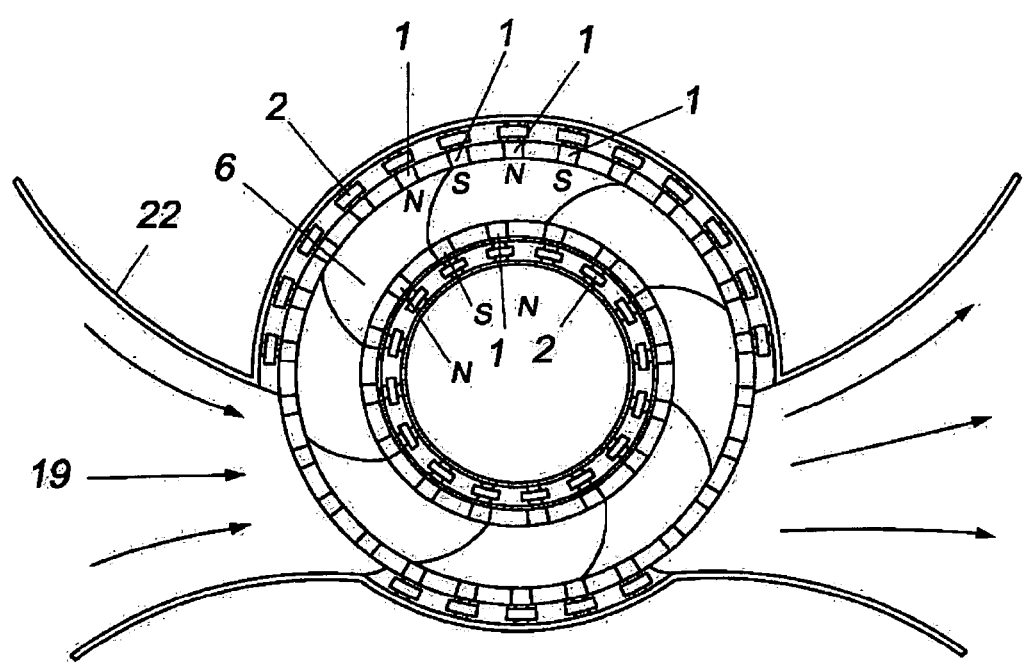
FIG. 9 represents the rotors and stators of a non-watertight ring-shaped magnetoelectric generator, positioned as explained in case d), and on the area of greatest and least radius of the blade runner of an open-center reel-shaped turbine with a drum of curved blades. (1) are the rotor magnets, (2) the stator coils and (6) the turbine blades.
Figure 10:
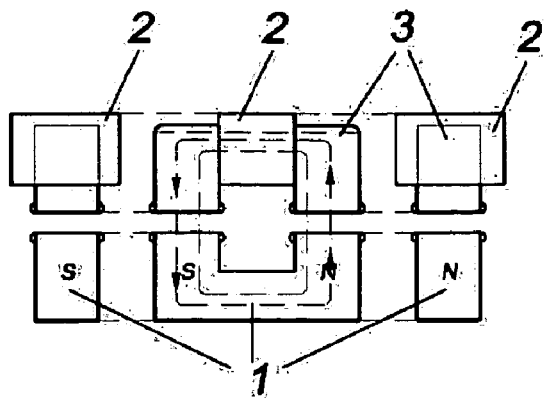
FIGS. 10 and 11 represent one of the rotor magnets and one of the coils (showing one of their possible specific forms) of the stator of a non-watertight ring-shaped magnetoelectric generator, placed as explained in case d). (1) are the rotor magnets, (2) the stator coils, (3) their cores and (6) the turbine blades.
Figure 11:
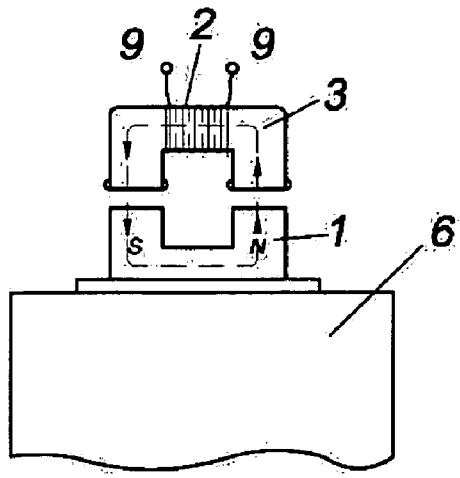

In this invention the use of non-watertight generators installed in the form of a ring is especially proposed, the generators being magnetoelectric or of variable reluctance. Although they can be used with any kind of turbine, their configuration, particular geometry and special mode of installation, are especially intended for use mainly with the turbine models proposed in this patent, the configuration and functioning of which is detailed in the following.

1. Ring-Shaped Variable Reluctance Generator

The explanation of their operation will be given with reference to FIGS. 1, 2, 3, 4, 5, 31, 32, 33, 45 and 46, although it is also applicable to FIGS. 16, 17, 18, 19, 25 and 26.

The stator (FIGS. 1 and 2, or in detail FIGS. 4 and 5) is formed by a ring (8) to which a plurality of magnets (1) or pieces made of a material of high magnetic permeability (38 in FIGS. 32 and 33) with one or more magnets (39 in FIGS. 32 and 33) inside them have been fixed (the magnets may be installed anywhere along the piece, or even one on either side of the air gap). The said pieces (38) (or magnets, if they are formed by a single magnet—(1) in FIGS. 1 to 5 and 31—) may have a horseshoe, toroidal, toroidal of square section, or another shape, having in all cases an air gap (52). Around each one of these pieces (or magnets, depending on the case) a winding (2) will be coiled.

The rotor of this type of generator is formed by a ring on the periphery of which alternating portions of high magnetic permeability (not magnetized) (5 in FIGS. 1, 2, 3, 4, 5, 16, 17, 18, 25, 31, 32, 33 and 45) and low magnetic permeability (4 in FIGS. 4, 5, 16, 17, 18, 25, 31, 32, 33 and 45) have been fixed. The portions of low permeability will preferably be diamagnetic (preferably of a high diamagnetism) and those of high magnetic permeability, ferromagnetic, although the ring could simply carry "teeth" of a high magnetic permeability material (5) (non-magnetized) and gaps (4). As the rotor turns, these portions of high and low magnetic permeability will move passing the air gap (52) of the magnet. It is convenient that the ferromagnetic portions are composed of a large number of thin laminae of the material, superimposed one on top of the other and insulated in between by means of a coat of shellac or varnish and strongly compressed, or by any other suitable method to minimize Foucault currents.

Each piece (38) (or magnet (1), if it is complete) of the stator with the material that each moment passes the air gap (52) will form a magnetic circuit whose reluctance will vary to the rhythm of turn of the rotor, which will give rise to a variation of flux in the magnetic circuit, and to the generation of an induced electromotive force in the coils. Even though the e.m.f. induced in each one of the windings is small, if we connect them to each other in an appropriate way, the contributions of each one will add up, obtaining in consequence an appreciable amount of electrical energy. Simply one pair of cables may come out of the whole set for transporting the generated electrical energy.

To prevent the ring of high and low magnetic permeability and the edges of the air gaps rubbing together, the magnets of the stator could be mounted with alternating polarity (which would keep the ring centered), and it would in addition also be convenient to coat it with a material that allows it to turn easily, avoids friction and that furthermore is non-stick, to prevent biofouling (for example a fluoroplastic, or similar). Also small bearings could be used—preferably non-metallic (to avoid inconveniences, for example that they get magnetized), but made of another sufficiently resistant material (a polymer, for example)—or another system if it is considered necessary (it will depend above all on the size of the turbine, the place of installation, the type of water, etc.).

The alternating portions of high (5) and low (4) magnetic permeability that form the rotor, can in principle have any thickness, size and geometry. It would be advisable that they have the same size and shape as the section of the air gap (52), so that they fit perfectly within it, with their edges parallel to each other and to the ends of the poles (as in FIGS. 3, 31, 32 and 33), but they could also have different sizes and shapes, being for example thinner towards the center of the ring and thicker towards the outside, being parallel to the pole surfaces on both sides of the air gap. etc., different waveforms being obtained with the different geometries. As for the pieces (38) of the stator, as already mentioned, neither is it necessary for the magnets to be complete. The advantage of using smaller magnets and the rest of each piece (38) of the stator being composed of a high magnetic permeability material (FIGS. 32 and 33), is that they are easier to handle and mount, as the magnetic forces between them are lower, which is interesting above all when mounting many of them adjacent and very close together (the number can vary, depending on the case) around the path of rotation of the rotor ring. Their mounting and maintenance is simpler, faster and therefore cheaper. The pieces (38) can be kept rigidly joined to each other by means of pieces (7 in FIG. 4) of a non-magnetizable material, or by filling the space between them with the same (3' in FIG. 5).

The rings of the generator can be complete or not, depending on the case. The rotor as well as the stator can be embedded in a resistant non-magnetizable material.

2. Non-Watertight Ring-Shaped Permanent Magnet Generators

The explanation of their operation will be given with reference to FIGS. 6, 7, 8, 9, 10, 11, 24, 27, 28, 39, 40, 41, 42, 43, 44, 47, 48, 49 and 50.

The rotor is formed by a rotating ring to which a plurality of permanent magnets (1) (preferably in the shape of a horseshoe, although it may be different) have been fixed. The stator is formed by a ring to which a plurality of coils (2) with a core (3) made of a magnetizable material without residual magnetism and of high permeability (for example, a large number of very thin laminae of Fe—Si insulated from each other and strongly compressed) have been fixed.

As the rotor turns, the magnets pass in front of the different coils with their cores, thus causing a variation of magnetic flux across them, giving rise to an induced e.m.f. A pair of wires (9) through which the generated current circulates comes out of each coil, being possible to connect those of the different coils to each other in an appropriate way so that the electrical energy generated can be extracted from the system by a single pair of cables.

Figure 42:
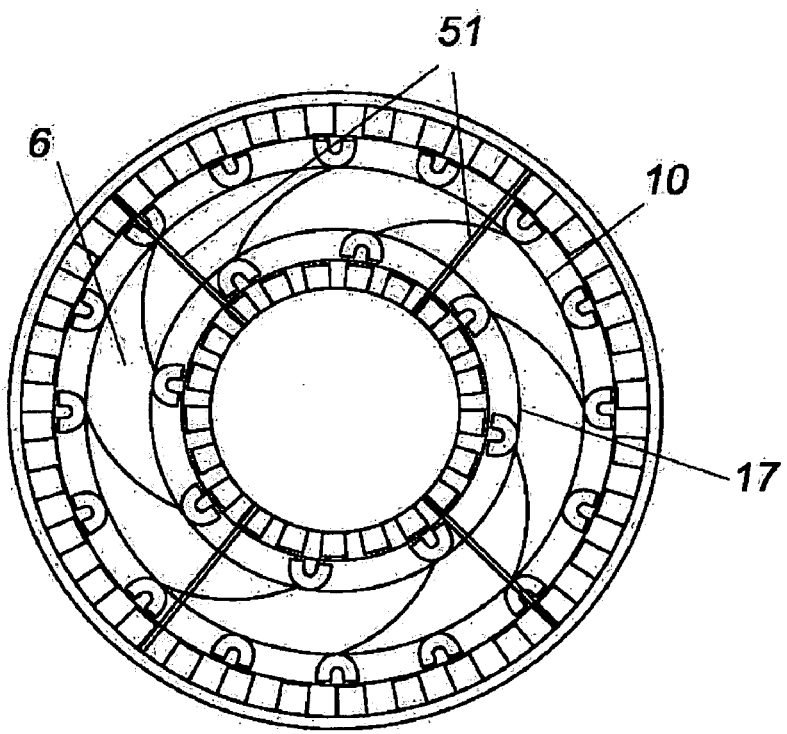
Figure 43:
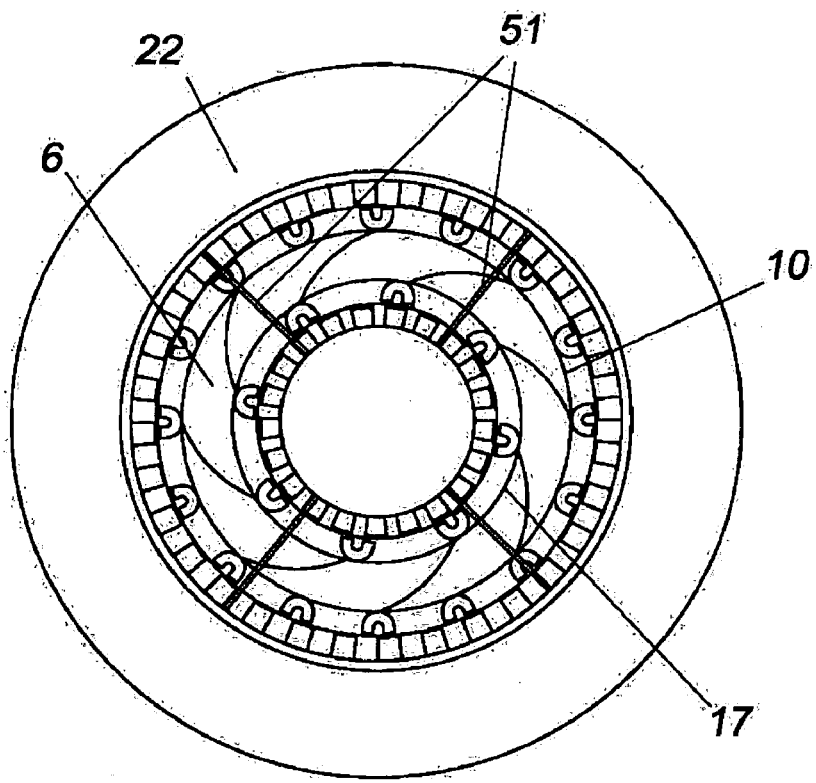
Figure 44:
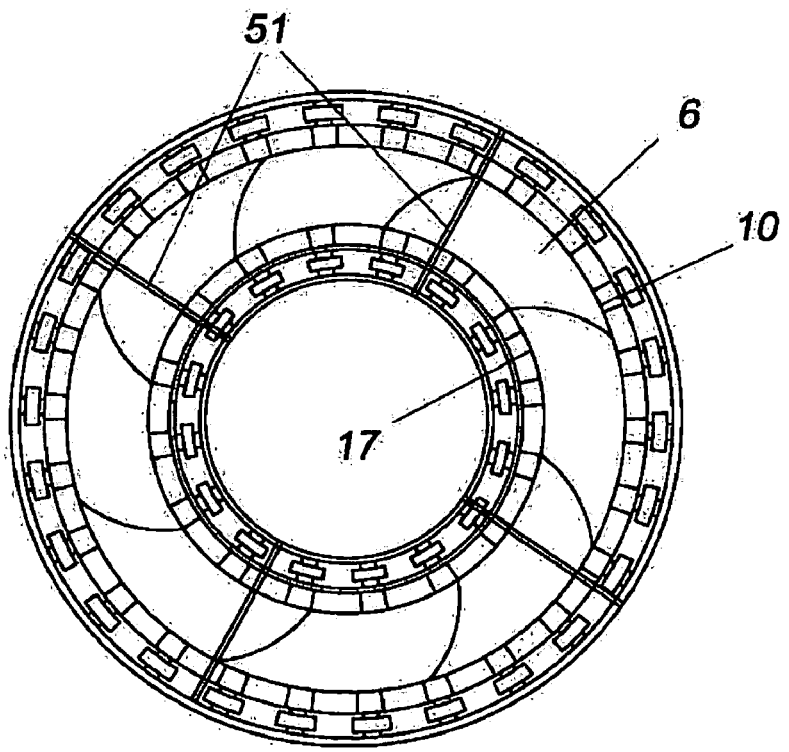
Figure 45:
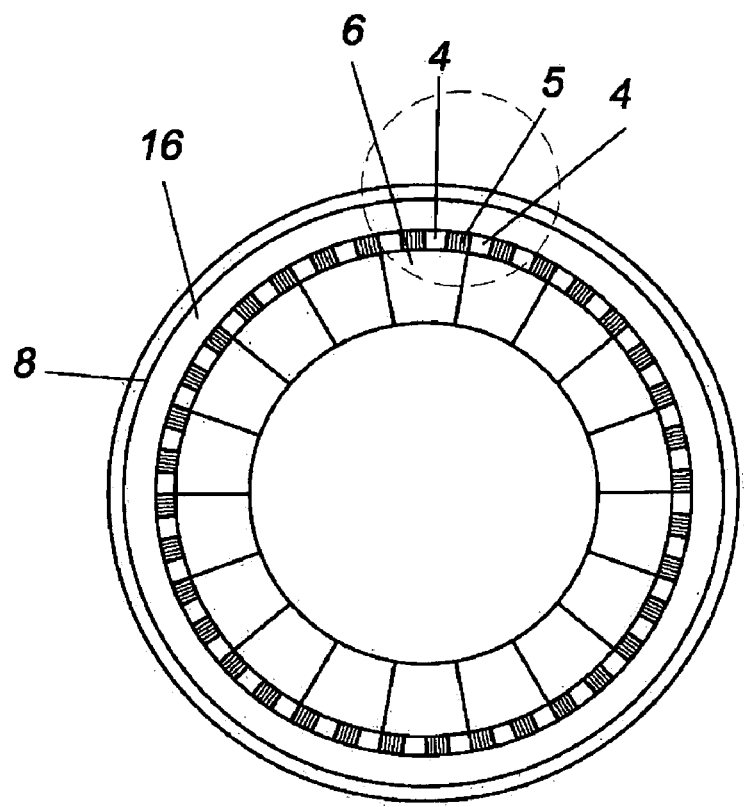
FIGS. 45 and 46 represent an axial turbine of open center with a non-watertight ring-shaped variable reluctance generator, which in FIG. 46 is installed on the area of least radius (17) of the blade runner, and in FIG. 45 on the area of greatest radius (10).
Figure 46:
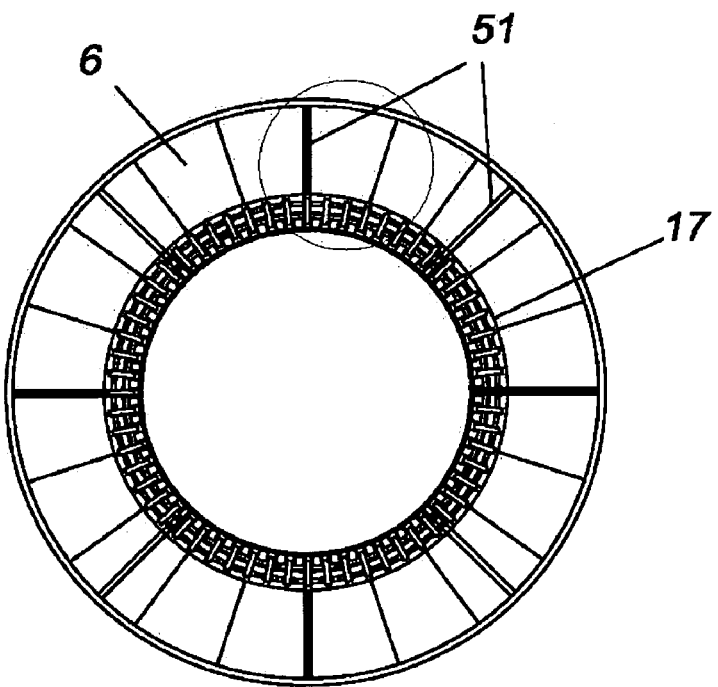
Figure 47:
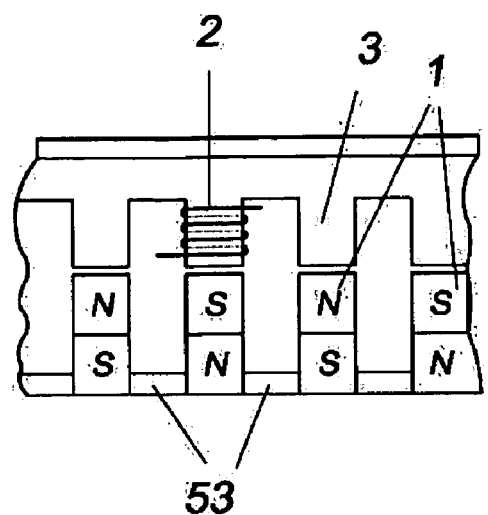
FIG. 47 represents an example of a ring-shaped permanent magnet generator according to case c). (1) are the magnets, (2) the coils with their cores (3), and (53) the material of high magnetic permeability connecting the magnets to each other.

The rotor magnets can be of different shapes, sizes and materials, and can be installed in several ways. Depending on the shape of the magnets and the way in which they are placed on the rotor ring, there are several possibilities, among which for example the following cases can be pointed out, among others:

a) Magnets installed longitudinally around the periphery of the ring, with their north poles adjacent to each other and their south poles adjacent to each other, forming a multipolar ring, as for example in FIGS. 6, 7, 8, 24, 27, 39, 40 and 41.

b) Magnets installed longitudinally around the ring, and separated from each other, as in FIGS. 42 and 43.

c) Bar-shaped magnets placed around the ring at a certain distance from each other, for example with alternating polarity (in such a way that if a magnet is joined to the ring by its north pole, the following is joined by its south pole) optionally joined to each other with a material of high magnetic permeability (53), as in FIG. 47.

d) Magnets fixed transversally to the ring, as in FIGS. 9, 10, 11, 28 and 44).

In each one of the cases, the stator coils should be placed in a suitable way on the ring, that is, in the examples, for cases a), b) and c) longitudinally, and for d) transversally.

The number of magnets that surround the turbine circumferentially can be varied in each case. The way of installation of the rings and the way of installation of the magnets in the ring can vary, and it will be as is more appropriate in each case.

In all of the ring-shaped generators, it is advisable that both the rotor as well as the stator be embedded in a resistant non-magnetizable material that fills the spaces between them (3' in FIG. 5), for example a plastic material, which would also have the advantage of protecting them against corrosion, avoiding the introduction of foreign substances between them (which would mean less breakdowns and maintenance) and preventing the formation of small turbulences.

The rings can be installed in many ways, and can be complete or not, depending on which is more convenient in each case. For example, if the ring-shaped generators are to be installed on the area of greatest radius of the turbines of types 1, 2, 4 and 5 which will be described later and these are to be installed in nozzles, the stators could be made up of only one or two ring sectors (one on the upper wall and the other on the lower wall of the area of its critical section, for example), as in FIGS. 12, 13, 14 and 15; but however, if they are of type 3, the rings should be complete (FIGS. 39, 40, 41, 42, 43, 44, 45 and 46).

Proposed Turbines

Any of the proposed types of generator may be used with many different types of turbine. The following is a description of the possible modes of installation for several examples of the proposed turbines.

1. Turbines with a Curved-Blade Drum (FIGS. 12 and 14)

Figure 12:
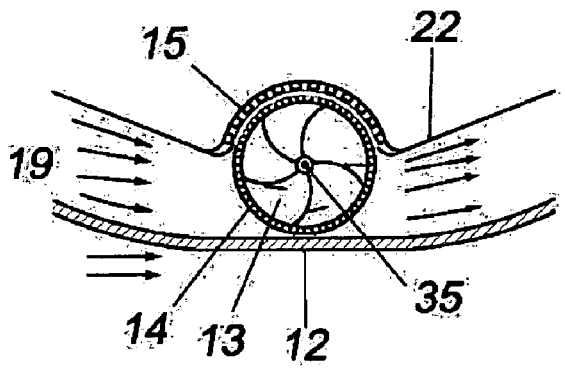
FIGS. 12 and 14 represent possible ways of installation of a turbine with a curved blade drum in the area of the critical section of a nozzle, which in FIG. 14 is convergent-divergent and intended for submerged installation (marine currents) anchored to the seabed, and which in FIG. 12 is intended for floating installation (waves).
Figure 14:
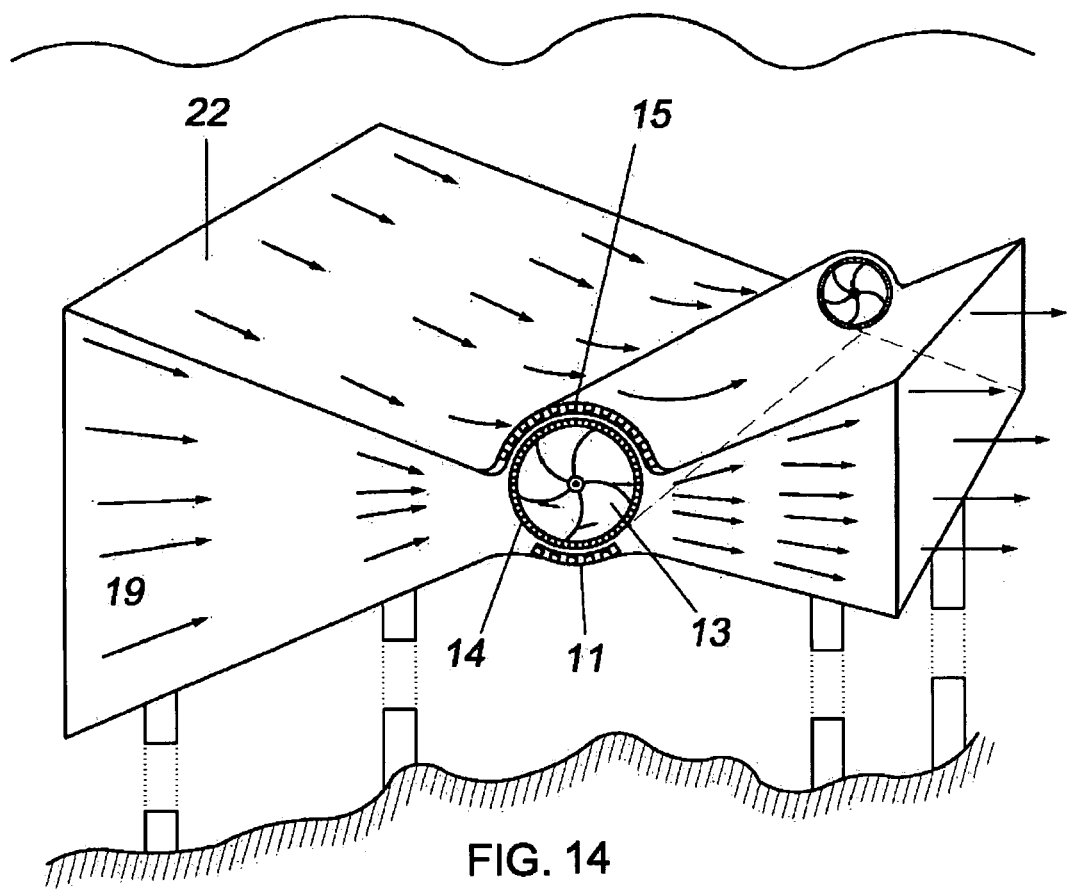

They have a drum (13) with curved blades that can rotate around a shaft, as shown in FIGS. 12 and 14, which can be concave, convex, or even flat. The current of the fluid (19) pushes the blades causing the drum to rotate around the transmission shaft (35). The number of blades may vary, as well as their specific shape, curvature and dimensions.

They will preferably be installed in the area of the critical section of a convergent-divergent nozzle.

2. Open-Center Reel-Shaped Turbines

Figure 13:
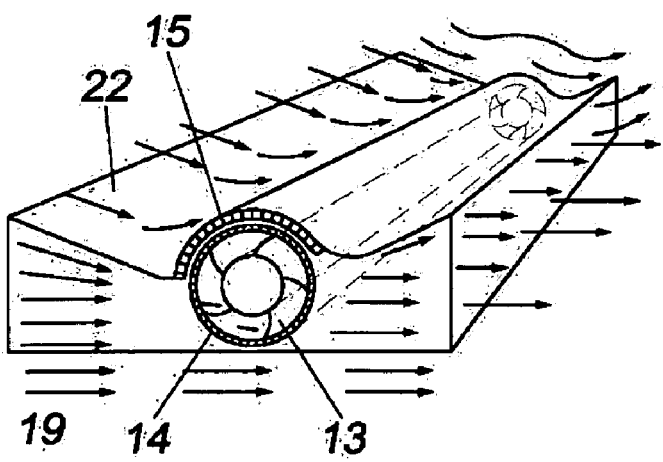
FIGS. 13 and 15 represent possible ways of installation of an open-center reel-shaped turbine, with a curved blade drum, in the area of the critical section of a convergent-divergent nozzle, that in FIG. 13 is for floating or semi-floating installation (waves) and in FIG. 15 is for submerged installation (marine currents). The turbines have ring-shaped generators installed (only one ring is shown), with the rotor (14) on the area of greatest radius of the blade runner (13), and the stator (11 and 15) on or inside the wall of the nozzle (22).
Figure 15:
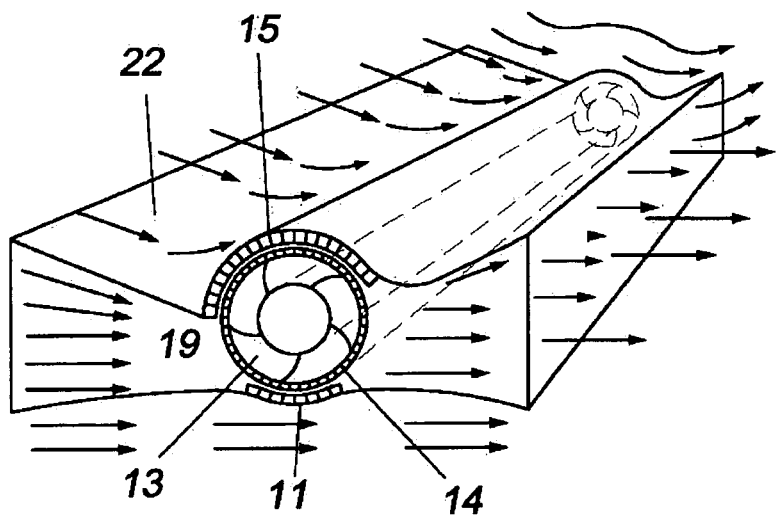
Figure 16:
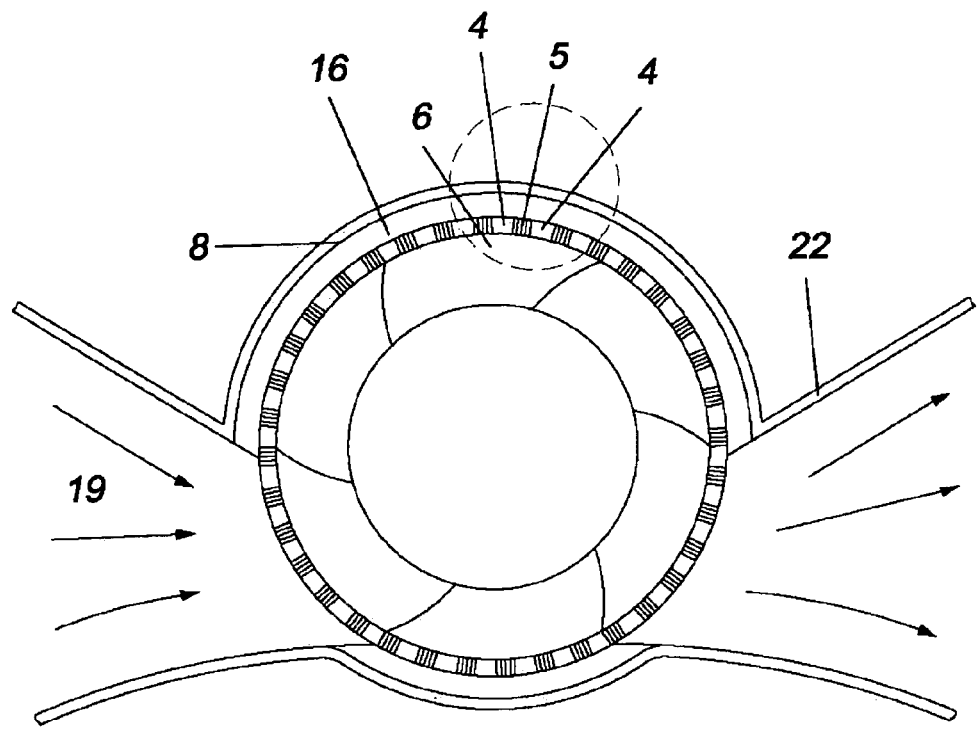
FIGS. 16 and 17 represent an open-center reel-shaped turbine with a curved blade drum installed in the area of the critical section of a convergent-divergent nozzle, with two sectors of stator rings and one rotor ring of a ring-shaped variable reluctance generator mounted on the area of greatest radius of the blade runner. (5) represents the portions of high magnetic permeability of the rotor and (4) the portions of low magnetic permeability, (6) the turbine blades, (8) the sector of the ring to which the magnets with windings of the stator have been fixed and (16) a sector of the stator ring.
Figure 17:
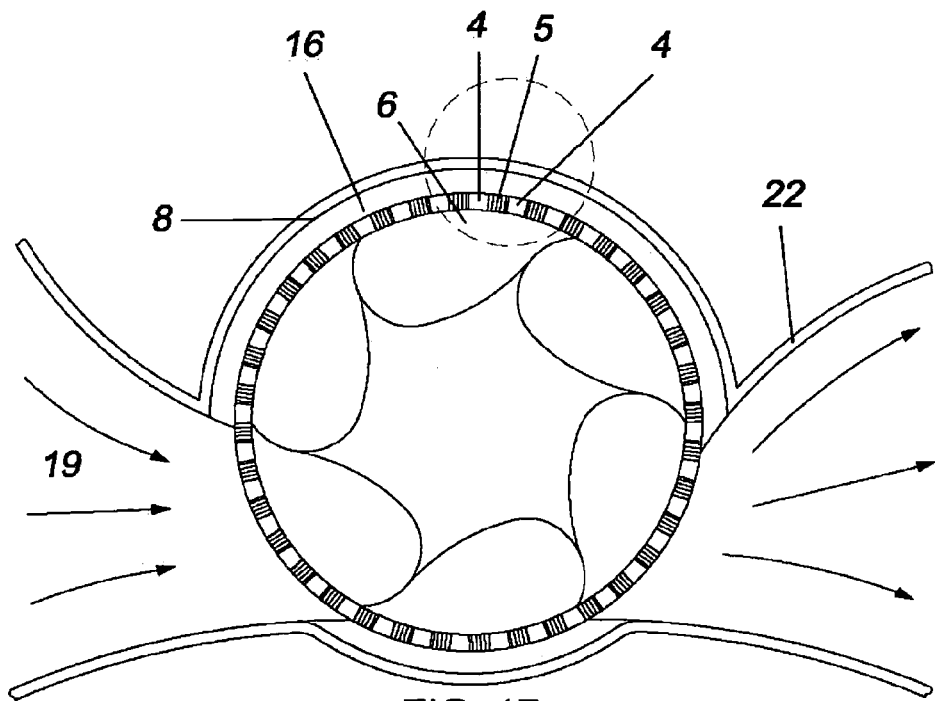
Figure 18:
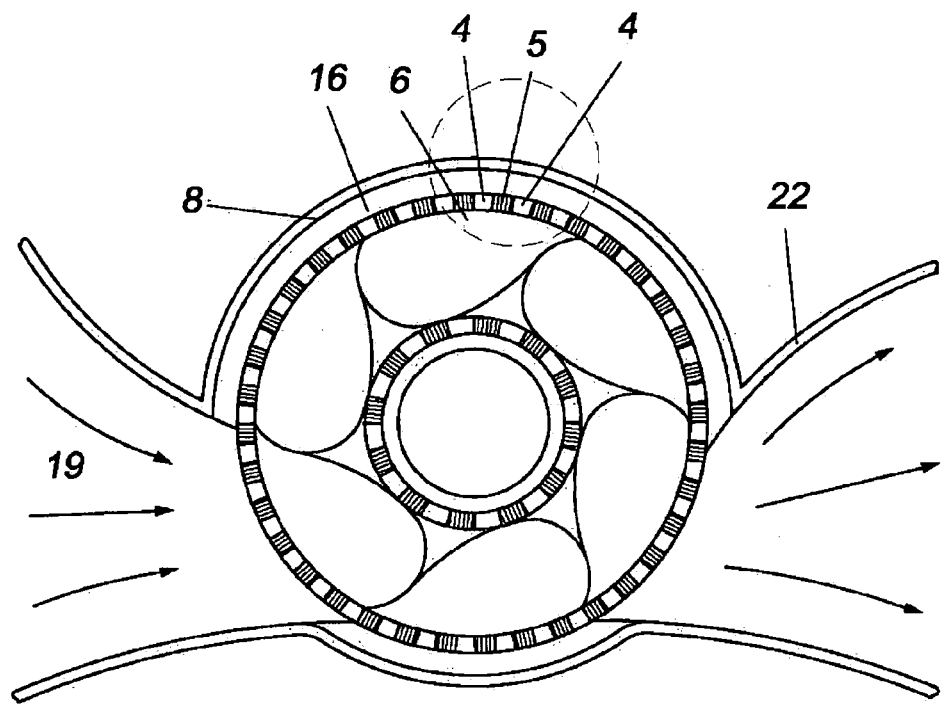
FIG. 18 represents the case provided with scoops, with a pair of added rotor-stator rings installed on the periphery of the area of least radius of the turbine rotor.
Figure 19:
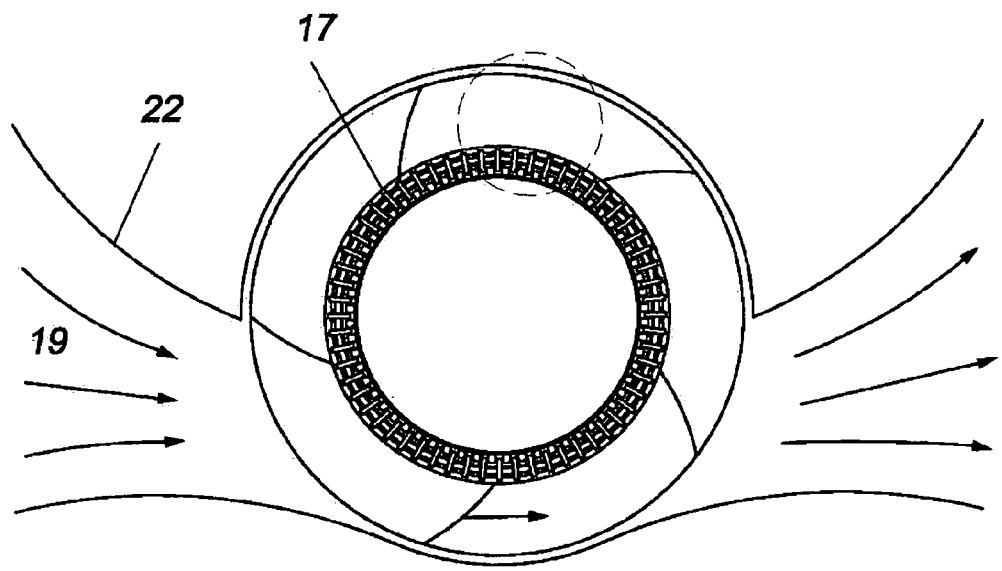
FIG. 19 represents an open-center reel-shaped turbine with a curved blade drum installed in the area of the critical section of a convergent-divergent nozzle, with a pair of rotor-stator rings of a ring-shaped variable reluctance generator mounted on the periphery of the area of least radius (17) of the rotor (13) of the turbine. The small circle indicates the area that has been magnified in FIGS. 4 and 5.
Figure 24:
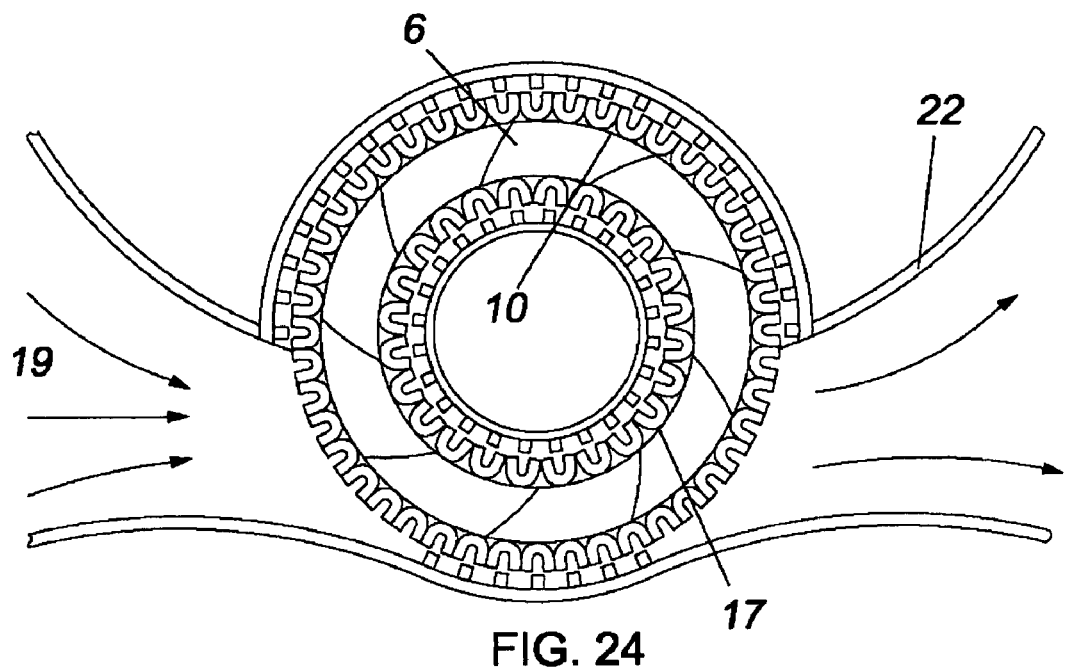
FIG. 24 represents an open-center reel-shaped turbine with a curved blade (6) drum installed in the area of the critical section of a convergent-divergent nozzle (22), with two pairs of rotor-stator rings of a ring-shaped magnetoelectric generator (case a), one of them mounted on the area of least radius (17) and the other mounted on that of greatest radius (10) of the turbine rotor.
Figure 25:
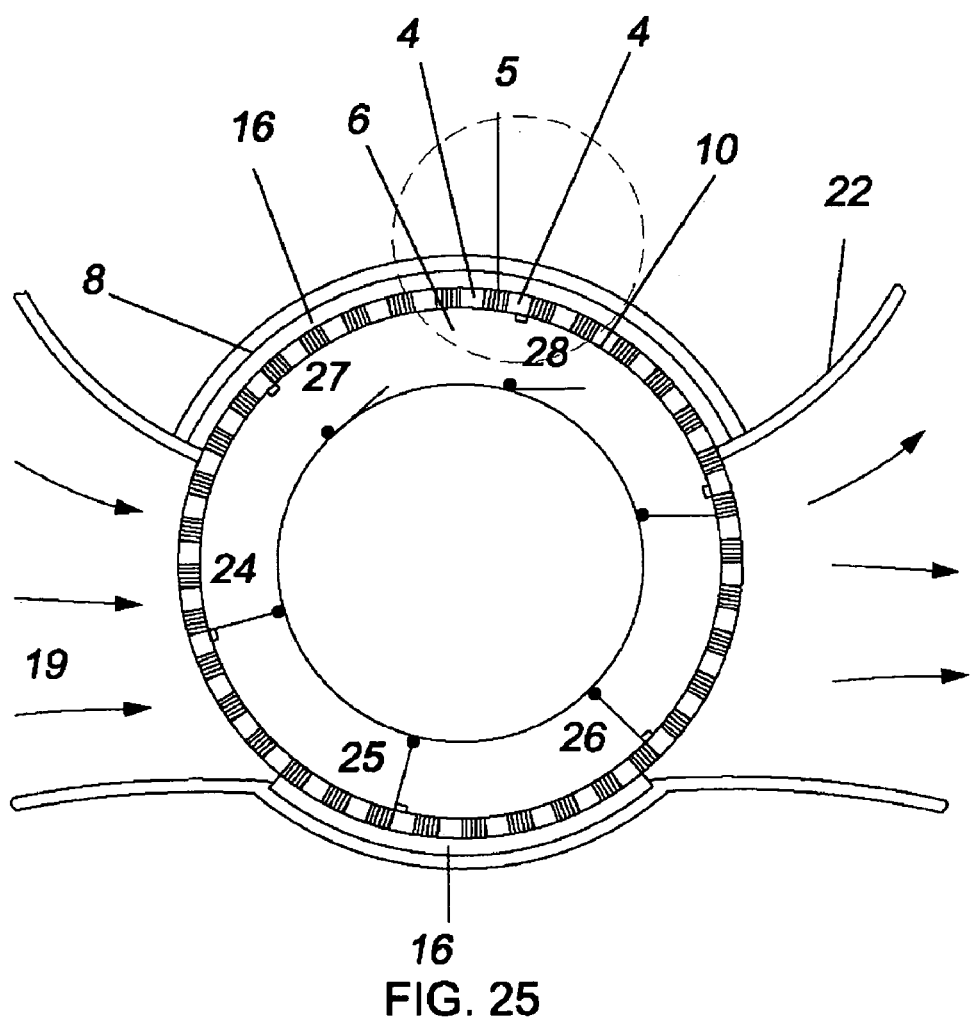
FIGS. 25 and 26 represent an open-center reel-shaped turbine with a drum of articulated blades, installed in the area of the critical section of a convergent-divergent nozzle (22), with a rotor ring and two sectors of stator rings (16) of a ring-shaped variable reluctance generator mounted on the area of greatest radius (10) of the blade runner (FIG. 25) or with one pair of rotor-stator rings of a ring-shaped variable reluctance generator mounted on the area of least radius (17) of the blade runner (FIG. 26). (5) represents the portions of high magnetic permeability of the rotor and (4) the portions of low magnetic permeability, (8) the ring sector to which the magnets with windings of the stator have been fixed and (16) the sector of the stator ring. (24), (25) and (26) represent the flat blades that have been carried by the current to a radial position causing the drum to rotate (27) and (28) represent the flat blades that have been carried by the current to such a position that they present no resistance to the passing fluid. (29) represents the stops that prevent the articulated blades from moving farther, thus causing the turbine to rotate.
Figure 26:
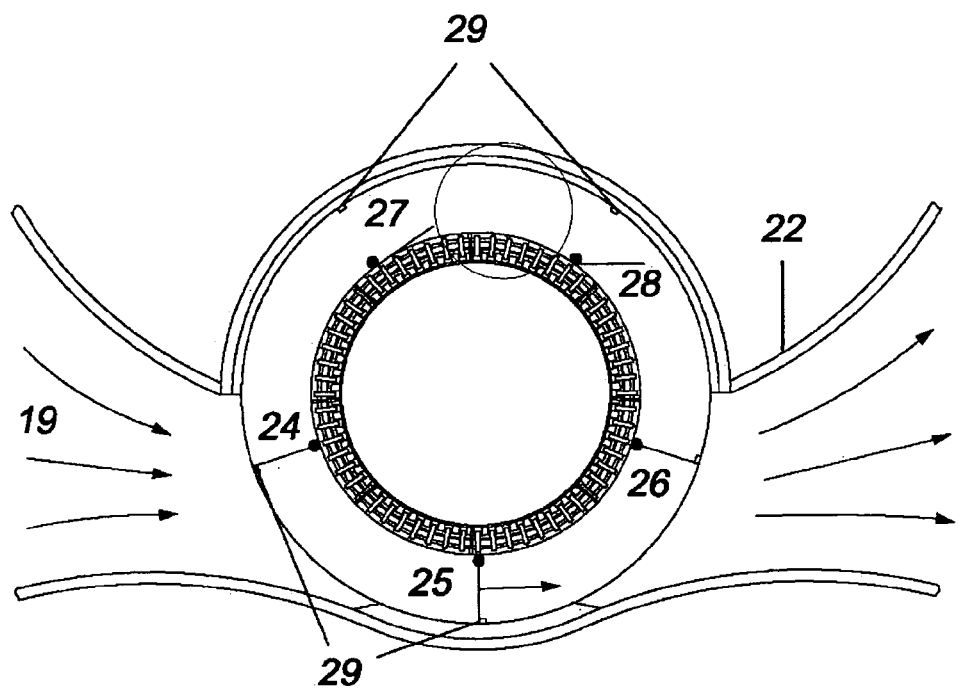
Figure 27:
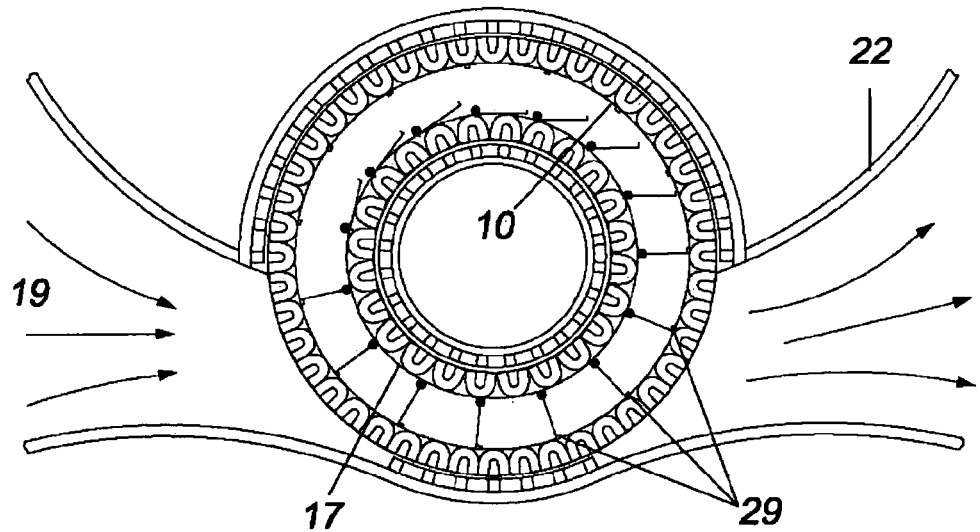
FIGS. 27 and 28 represent an open-center reel-shaped turbine with a drum of articulated blades installed in the area of the critical section of a convergent-divergent nozzle (22), with two pairs of rotor-stator rings of a ring-shaped magnetoelectric generator, one of them mounted on the area of greatest radius (10) and the other one on that of least radius (17) of the blade runner.
Figure 28:
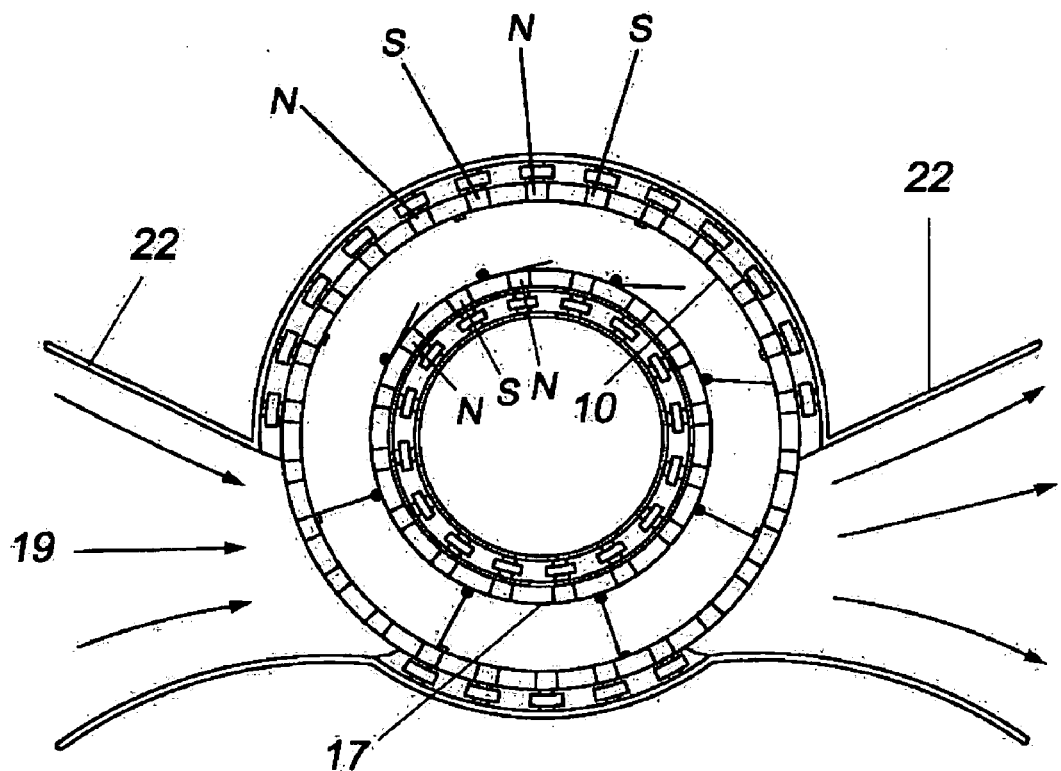

In this case the turbines can be as described in the previous section, but the difference being that the central part has been eliminated, that is to say, both the central shaft with the system of bearings, as well as the part closest to the center and of least radius of the blades. This has advantages, because the area of the blades that produces the most power is the extreme area or of greater radius (FIGS. 13 and 15). In this way, and as the heaviest part of the turbine has also been eliminated, a high efficiency will be obtained at a much lower cost than in the previous case, also requiring less maintenance, since the shaft and other elements in the area closest to the shaft are the most expensive to fabricate and the ones that could need a higher maintenance (cleaning of encrusted, stuck materials, or even seaweed entangled in the same, etc).

In general these turbines (FIGS. 13, 15, 16, 17, 18, 19, 24, 25, 26, 27 and 28) are formed by a drum (whose size can vary as well as the specific shape of its section) on the periphery of which a series of blades or scoops are mounted (the number of which may vary), which could be concave, convex, or flat, fixed or articulated, and of varying dimensions, curvature, position, the specific shape of each one, the articulation system that is used and the material of which they are made and/or coated both of the drum and the blades. The center having been eliminated, the number of blades can be greatly increased.

One of the possible embodiments of this type of turbine with articulated blades is shown in FIGS. 25, 26, 27 and 28. In the figures it can be seen that the blades have articulations at the ends with which they are connected to the rotating drum, and may have stops (29) at the farthest points of the turning radius (preferably at the lateral extremes of the cylindrical crown, and with one pair for each blade). Depending on the direction of flow of the fluid (19), and if they are positioned in a suitable way, a part of the blades (24, 25 and 26 in FIGS. 25 and 26), impelled by the current, will tend to be placed in the radial direction and perpendicular to the same, so that they will cause the drum to rotate, while the rest (27 and 28 in FIGS. 25 and 26) will be impelled by the flow of the current to be situated in a horizontal position or at a tangent to the cylinder of the drum so that they do not present any resistance to the passing fluid. The blades are not situated in the radial direction until the cylinder has rotated sufficiently for them to remain in a position such as (24), (25) and (26) in FIGS. 25 and 26, so that the cylinder will always rotate in the same direction. The stops (29) prevent the articulated blades from rotating beyond them and, by being pushed by the blades in motion, cause the drum to rotate.

The drum of blades or scoops can rotate freely, or around a fixed tube or cylinder (open or closed, hollow or not), or around a system of rings joined to each other by a series of axial braces, or around a cylinder with a system of rings on its periphery. The diameter and other dimensions can be variable, as well as the material of which they are constituted and the material with which they may or may not be coated. If they have a central tube or cylinder, with or without a system of rings, this can be open or closed, and the different elements can be solid or hollow, and in this case they could be full of air or totally or partially filled with another material, such as for example polyurethane foam, polystyrene or any other material, preferably of low density and that provides buoyancy.

Having only a system of rings with braces, besides making the system lighter, has the advantage of greatly reducing friction. This system of rings can also be installed on the periphery of an inner cylinder, if the only aim is to reduce friction. If the fixed component that performs the functions of the axle of rotation (even though its size may be very big and have a large diameter) is open at the sides (the ends of the cylinder, if it is the case), it is convenient to have a protection grille so that foreign substances don't accumulate inside it. If it is closed it has the advantage that foreign substances will not accumulate on the inside.

Although these turbines could be directly installed in this way, it is advisable that they be installed on the inside of a nozzle (preferably in the area of the critical section of a convergent-divergent nozzle (22), as for example in FIGS. 13 and 15), and in this case the drum of blades or scoops could even be free-turning, (that is to say, without the need for any system of rings or fixed cylinder inside acting as an axle around which it rotates).

3. Open-Center Axial Turbines (FIGS. 36, 37, 38, 39, 40, 41, 42, 43, 44, 45 and 46).

Figure 36:
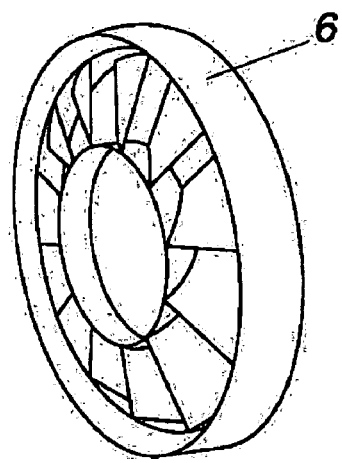
FIGS. 36 and 37 represent an axial turbine with an open center, that in FIG. 38 is installed in the area of the critical section (50) of a convergent-divergent nozzle (22) (in this case of circular section).
Figure 37:
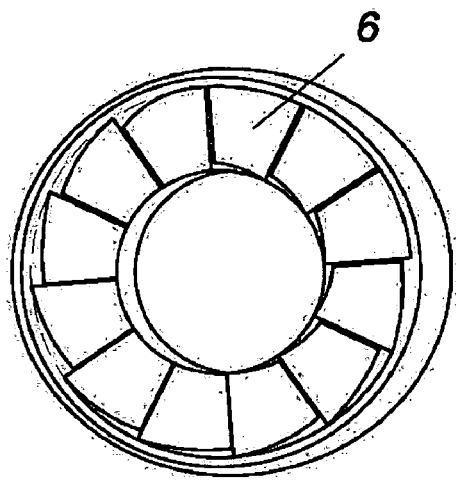

In this case the turbines will be in the form represented in FIGS. 36 and 37, that is to say, axial turbines with an open center.

Open-center turbines can be built, installed and used of a larger size than in the previous cases, and also be larger than the conventional helix, Kaplan or Francis turbines, normally used in traditional hydroelectric power stations, since in those it does not prove efficient or profitable to build in a large size. Another advantage of these open-center turbines is to eliminate the problem of turbulences that are produced close to the center, which is very convenient since they cause a reduction in efficiency, draw fish and foreign substances into the interior and cause environmental alterations that affect the fauna in their proximity. This type of turbine also has lower cost of fabrication and maintenance.

Figure 35:
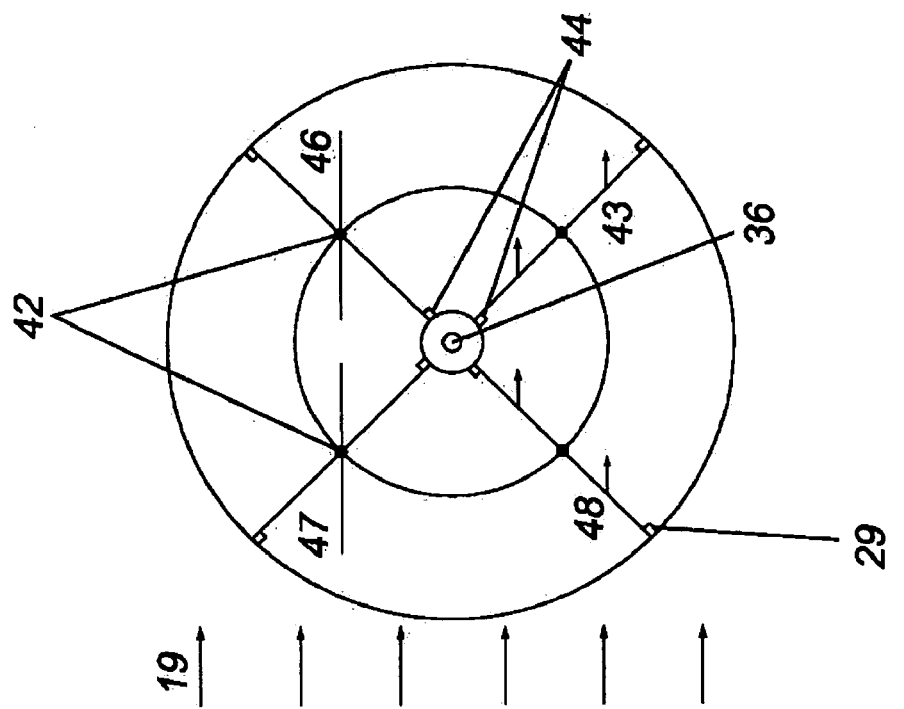
FIGS. 34 and 35 represent a turbine of the paddle-wheel type.
Figure 34:
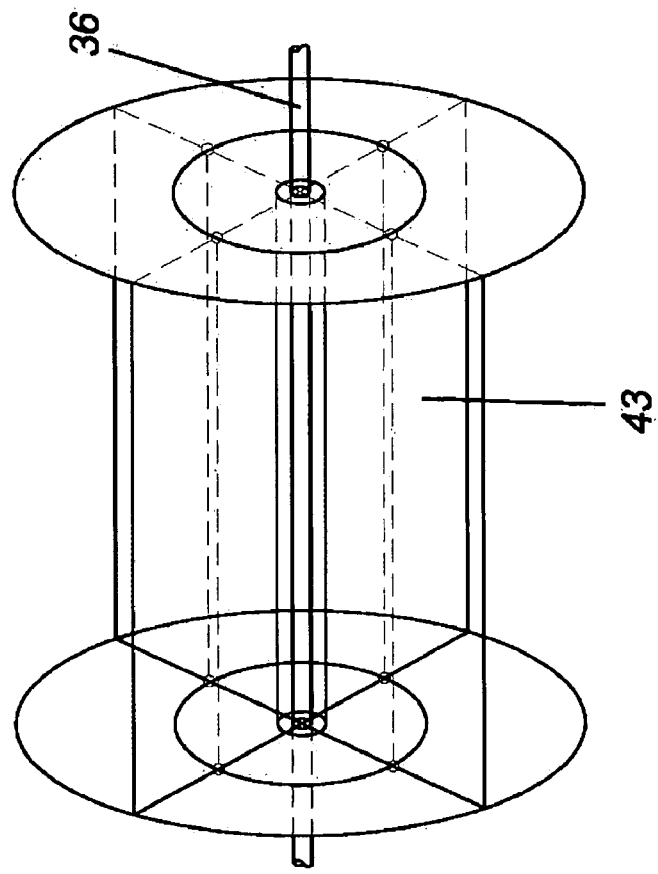

4. Turbines of the Paddle-Wheel Type (FIGS. 34 and 35)

They have a drum which has a series of rotating paddles (43, 46, 47 and 48) (whose number may vary, as well as the material of which they are made, and the material which they may or may not be coated with, and also the specific shape of each one) that can rotate around a shaft (36) and that are articulated by means of pivots (42) positioned at an intermediate point (preferably closer to the central shaft than to the ends), having a system of stops, some of them situated on the part of greatest (29) and others on that of least radius (44). The fluid impels the paddles, in such a way that if the current (19) comes from left to right, the paddles of the upper part of the semi-circle (46 and 47) swing around the pivots and are carried to remain in a position parallel to the direction of the flow, thus not presenting any resistance to the passing fluid, while the paddles on the lower part (48 and 43) of the semi-circle pivot with respect to their hinge and turn until they are braked by the stops (29 and 44), ending up situated in a radial position and thus offering resistance to the passing of the fluid. In this way, the paddles of the lower part make the drum rotate, while the rest do not act.

5. Cycloidal Turbines AND Cycloidal Turbines with an Annulus (FIGS. 20, 21, 22, 23).

Cycloidal turbines have a series of articulated paddles (18 and 20) mounted around a disc (55), as shown in FIGS. 20 and 21. Depending on the direction of the current, and if they are positioned in a suitable way, the corresponding blades will be placed in a perpendicular direction (18-*a* and 18-*b*) to the flow of the current (19) and will cause the disc (55) to which they are connected rotate, while those that are not in an appropriate direction (20-*a*, 20-*b* and 20-*c*) do not act, inasmuch as while the fluid has driven some to position themselves perpendicular to the current, those diametrically opposite will have been carried by the current to a horizontal position, whereby they do not present any resistance to the passing of the same. Because of that, the disc will always rotate in the same direction.

Cycloidal turbines with an annulus (FIGS. 22 and 23), are similar to cycloidal turbines but with the difference that the articulated blades, instead of being connected to a rotating disc, are connected to an annulus (21) (whose thickness can be variable) that can rotate. They have a number of blades connected by means of an articulation on their base to an annulus that can rotate.

Both the disc and the annulus whose rotation is caused by the blades, according to the case, can rotate freely on the inside of a fixed pseudo-ring (with a C-shaped or similar section, so that it can enter a little on the inside) that surrounds it. The annulus can also rotate around a fixed central ring acting as an axle. The diameter and other dimensions of the rings can be variable, as well as the materials of which they are constituted and the materials with which they may or may not be coated. These rings and pseudo-rings can be hollow or not, and could be totally or partially filled with another material, preferably of low density and that provides buoyancy, for example polyurethane foam or polystyrene.

In all cases, the blades can be flat, concave or convex, with their curvature, dimensions, specific shape, the materials of which they are made and the materials with which they may be coated being possibly variable.

Nozzles

Although the turbines could be used without a nozzle, much bigger and more costly sizes of turbines would be needed to obtain the same amount of energy than with other smaller units used on the inside of a nozzle. For that and other reasons, it is convenient that the rotating drum of blades or scoops of the turbine be installed in the area of the critical section of a nozzle, preferably convergent-divergent (22) (for turbines of the type described in sections 1, 2, 4 and 5, preferably that of the type indicated in FIGS. 12, 13, 14 and 15, and for axial turbines such as described in section 3, preferably like the one indicated in FIGS. 38 and 43), in such a way that the mouth of the convergent part through which the moving fluid (19) enters is at a far enough distance from the area of the critical section of the same and has a much greater section. This has a double objective:

1) To increase the speed of the fluid by the venturi effect, given that the more the section diminishes, the more the speed of the fluid will increase.

2) To channel a large amount of fluid towards the critical section. For a given size of the drum, the larger the section of the mouth of the entrance, the larger the mass of channelled water will be.

Figure 38:
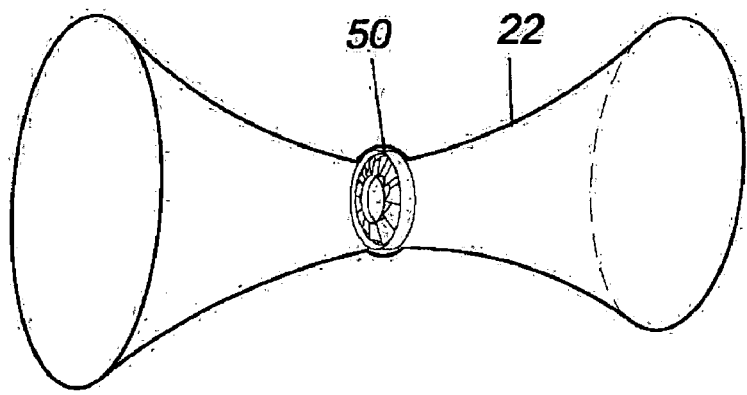
Figure 39:
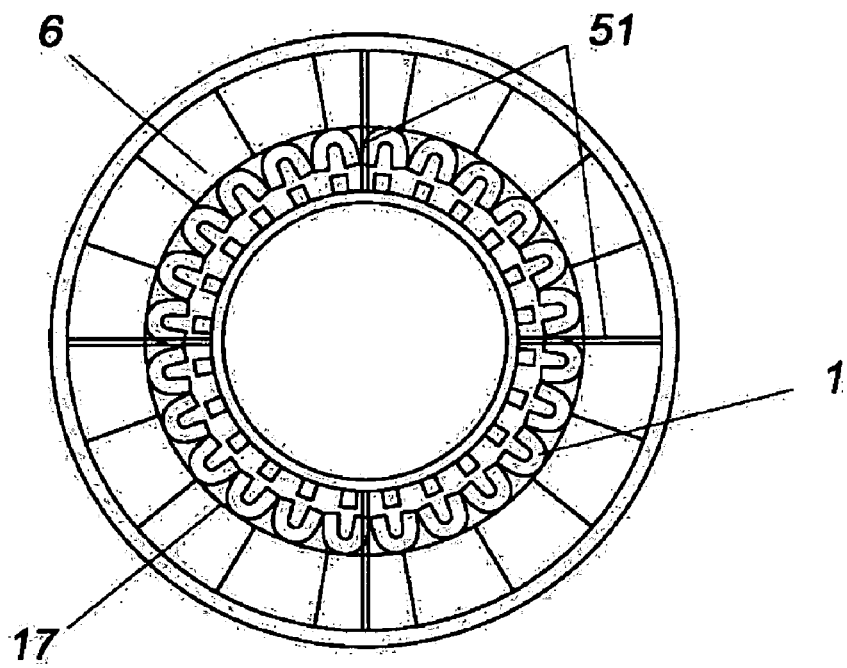
FIGS. 39, 40, 41, 42, 43 and 44 represent an axial turbine with an open center, with a ring-shaped non-watertight permanent magnet generator.
Figure 40:
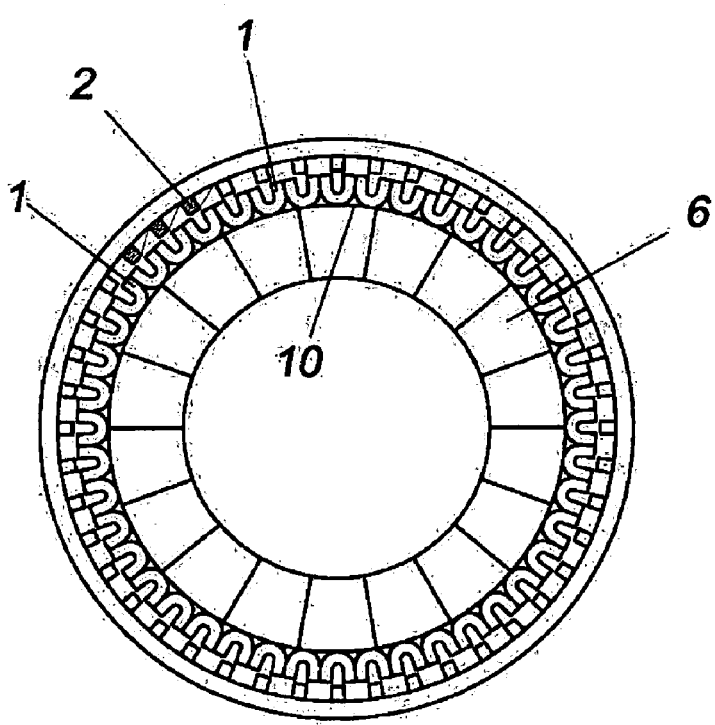
Figure 41:
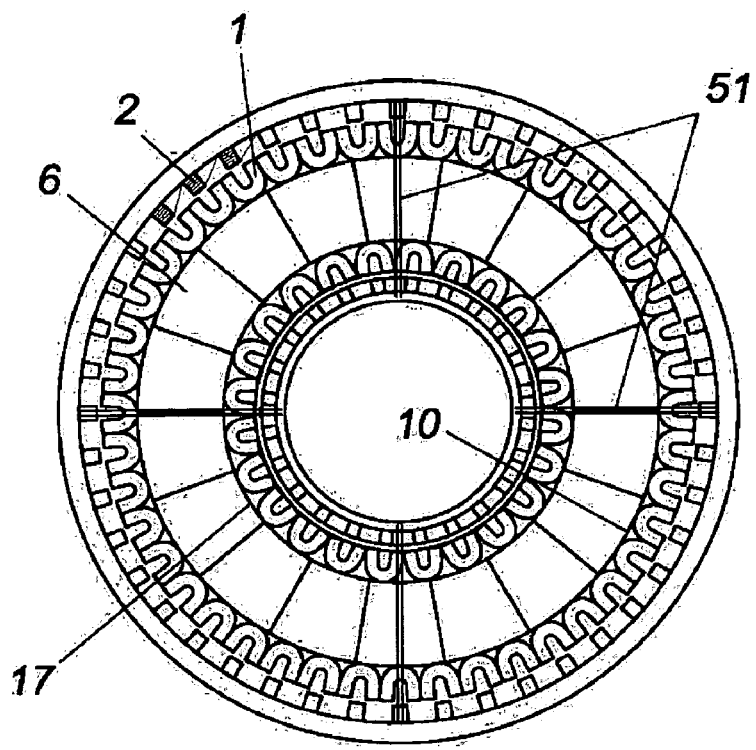

The critical section of the nozzle shown as an example in the drawings for turbines of types 1, 2, 4 and 5, where the drum is installed, is rectangular (FIGS. 13, 14 and 15), and the one of the example for turbines of type 3 is circular (FIGS. 38 and 43). The divergent outlet part of the nozzle can be of a different length and angle of opening compared to the convergent inlet part.

Each one of the convergent or divergent parts of the nozzle can be concave, convex or flat, and their shape, curvature and dimensions can be variable, as well as their angle of opening and the material of which their different elements are made and that can be used as a coating. Said nozzles can have their upper part different to the lower, the lower part being able to be totally flat or with a certain curvature (concave or convex), and the upper part being able to have an angle of opening and a curvature in the part closest to the critical section greater than the lower part, in such a way that the water at the inlet is directed more towards the lower part of the blade or scoop runner of the turbine than towards the upper part.

The nozzles shown in the drawings are one possible form of realization of the same, without that meaning that we should be limited to using those particular geometries and dimensions, since their size and shape allows for many variations. Specifically, those of FIGS. 12 and 13 would be suitable for floating installation (for use, for example, with waves, even in areas of breakers, and in this case the inlet opening must have a height of a sufficient size for the normal height of the waves in its place of installation), in which case they could have a slab (12 in FIG. 12) of a low density material on their base (for example extruded or expanded polystyrene) to provide buoyancy. They would be ideal for seas where there are no tides, such as the Mediterranean, since the level of the sea hardly varies in them, they would always be in a suitable position. In the case of locating them in tidal zones, they should have a special system of anchoring that allows for varying the height of flotation so that it is always appropriate. Those represented in FIGS. 4 and 15 would be suitable for submerged installation and to be used, for example, with marine currents.

It is convenient to provide grilles or nets at the mouth of the nozzles to prevent foreign substances from entering that can block or hamper the rotation of the drums. These grilles or nets can be made of diverse types of materials, but it is advisable that they be light and simple to remove to proceed with their cleaning. They could be placed in pairs and mounted for example on a pair of neighbouring parallel slots, so that while one is being cleaned the other continues protecting the entrance to the nozzle. This will also prevent fish from entering, thus avoiding them from being swept into the rotor blades (which, in addition to causing their death, could clog and brake its operation).

The nozzles can be divided into sections. Above all, in the case of large-sized systems that have many blades or scoops, the nozzles could be divided into transverse sections, in such a way that each of them has a height in the area of the critical section, for example, approximately equal to the distance between two succeeding blades or scoops, so that the flow of water is better directed towards each one. The nozzles could also have guiding vanes in the cases where it is considered appropriate.

For open-center reel-shaped turbines, the system of rings with braces or the fixed inner cylinder around which the blade or scoop runner turns, can be secured at their ends to the lateral walls of the nozzle. If the blades are articulated, the stops can also be located on the area of the outer periphery, on the part close to the lateral walls of the nozzle. For open-center axial turbines, the central ring can be secured by braces to the walls of the nozzle.

Inside each nozzle (and/or on each drum) there can be several pairs of rings (armature-exciter pair), installed circumferentially around the blade runner and at a certain distance from each other along the direction parallel to the axis, and the cables coming out from each pair can be suitably connected to each other so that only one pair of cables comes out from each unit. These may be connected or not to other possible units installed in nearby areas, to finally have a single pair of cables that will go to a step-up transformer, where the voltage will be raised in a suitable way for its transport to the place of use or to the electrical grid for its distribution.

The Way of Installation of the Generators in the Turbines

1. Ring-Shaped Generators

The rotor rings of the generator (14 in FIGS. 12, 13, 14 and 15) can be fixed to the area of greatest (10) or least (17) radius of the blade runner of the turbine, depending on the case, or to both if the turbines are of open-center (and for cycloidals with an annulus, they can be fixed to the rim of the outer circumference, or the inner or to both). If the turbines do not have an open-center, they can obviously be fixed only to the area of greatest radius (10) of the blade runner of the turbine.

For open-center turbines, and if they have rotor rings on the area of least radius (17) of the blade runner of the turbine, the stator rings may be fixed to (or better embedded in) the ring or system of rings with braces or fixed inner cylinder acting as a shaft, depending on the case.

Both if they are of open center as well as if they are not, and if the turbines are independent, if they have rotor rings on the area of greatest radius (10) of the blade runner of the turbine, each stator ring can be fixed to or embedded in a ring of resistant and non-magnetizable material, that can be fixed to the inside of a casing with the shape of a pseudo-ring or a ring sector with a C-shaped section or similar (on the inside of which the rotor can enter a little, serving at the same time to secure it in order to prevent it from "falling") and installed in such a position that the rotors, when turning, pass in front of the stators (or pass the air gaps, depending on the case). If the turbines are installed in the area of the critical section of a nozzle (22), if they have rotor rings in the area of greatest radius of the blade runner, the stator rings may be fixed to (or better embedded in) the wall of the nozzle in the area of its critical section, and the nozzle should have some stops or a similar system, with the corresponding magnets, on the corresponding part where the turbine is installed, to prevent it from "falling" towards the front or the back. The turbine can rotate around a fixed central ring that acts as an axle or can rotate freely on the inside of a fixed pseudo-ring (with a C-shaped or similar section, so that it can enter a little on the inside) that surrounds it, in order to prevent it from falling towards the front or the back, and in this case, in the case of turbines of type 3 it is convenient that they be complete rings, but in the case of turbines of types 1, 2, 4 and 5 it is not convenient that they be complete rings but sectors of the same, of adequate dimensions to the parts of the nozzle in which they are going to be installed (to do that, the curvature of the nozzle in the area of its critical section has to be equal to that of the outer circumference of the rotor of the turbine). Whichever is the case, they ought to be installed in a position such that the rotors, when turning, pass in front of the stators (or pass the air gap, depending on the case). They may also have systems of stators and rotors on the two areas (outer and inner) simultaneously.

In the case of independent turbines, it will be the casing in the form of a pseudo-ring or a sector of ring with a C-shaped section (or the system of rings, that can be joined by braces, depending on the case) having the ring of stators, that will be fixed, hanging or anchored in a given position to prevent them from being drawn by the current, and it should be made of a resistant non-magnetizable and preferably light material. This C-shaped casing (or pseudo-rings with a C-shaped section joined by braces) should be joined to the ring or system of rings or fixed inner cylinder, if it has one, by means of suitable braces or by some other means.

Although bearings can be used, in order to avoid friction between the rotor and the fixed parts, "spacer" magnets or electromagnets (suitably insulated) of an appropriate size to that of the turbine can be provided, which can be spaced regularly, some on the rotating part and others on the fixed (the walls of the fixed parts of the casing or elements in the form of a pseudo-ring with a C-shaped section that has the stator ring, or nozzle and/or inner cylinder or ring or system of rings with braces—and in this case, for example, preferably on the external part of the braces that join the rings—), with others of the same polarity on several areas of the outer and inner periphery of the rotating part of the turbine, installed in such a way that like poles face each other and repel each other. In this way no contact is produced nor any friction, either radial or axial, between the rotors and stators, thus avoiding the need to use bearings. The "spacer" magnets or electromagnets of the lower part of the pseudo-ring with a C-shaped section or of the nozzle and the top of the inner cylinder or ring or system of rings should be more powerful than those of the corresponding opposite part, to compensate for the tendency of the blade runner to fall due to its own weight. Likewise, those of the rear parts (where the current exits) of the pseudo-ring with a C-shaped section or of the nozzle and front parts, (where the current enters) of the cylinders or rings or systems of rings, should also be more powerful (than those of the front part of the pseudo-ring with a C-shaped section or of the nozzle and rear of the cylinder) to counteract the push of the fluid. In any case in the front part through which the current enters they would not be necessary, since this pushes the turbine towards the back. All of the preceding is for the application above all especially for turbines of type 3, which are the most suitable for higher speeds of fluid, which in this way would be able to rotate freely on the inside of the pseudo-ring with a C-shaped section or similar.

Each turbine can have one or several ring-shaped generators, their number being able to vary.

2. Independent Generators

The aforementioned turbines can also be used with non-watertight independent generators, either magnetoelectric or variable reluctance. In this case, independent generators can be used for each nozzle and turbine (each turbine can have one or several generators), being possible to install common generators for every two turbines, for example, since the turbines can be installed in couples, and in this case, for example, being placed in the middle, on the common central shaft between the two nozzles or turbines, taking into account that, by doing so, it is advisable to use differential components on the shaft to prevent the stress that the shaft would undergo in the event of local variations in the speed of the current that would affect the speed of rotation of each one of the turbine pair with a common generator. It is necessary to take into account that, for open center turbines, it is advisable to connect the exciter shaft to the central point of the ends of the rotating drum (if it is of type 2) or to the geometric center of rotation of the drum of blades (if it is of type 3) of the turbine or turbines, which can be done by means of radial braces that connect to each other in the center of the end of the rotating drum of the turbine, (on the corresponding sides of the nozzle in the cases of turbines type 1, 2, 4 and 5), or to the geometric center of rotation of the blade drum in the case of open-center axial turbines (type 3).

The generator shaft can be directly connected to the turbine, or otherwise by means of a gearbox (as for example that of FIG. 30), which should be suitably insulated. The object of the gearbox is to obtain a much greater speed of rotation of the generator rotor (36) than that of the turbine (35), such that although the turbine rotates at a low speed, we can obtain greater speeds of rotation of the rotor of the generator, and with that higher values of induced electromotive force. FIG. 30 represents the most simplified example possible of a gearbox system that, connected to the shaft (35) of the drum, by means of the shaft (36) transmits the rotation to the rotor of a generator. The said system has a series of gears formed of gear wheels (31, 32, 33 and 34) with different radii so that it increases the speed of turn, it being possible to insert the number of gear wheels and axles that one wishes, having a suitable radius to obtain the rotation speed of the rotor shaft (36) that one wishes. The shaft (36) of the last gear wheel (34) moves the rotor of the generator, which in the case of that represented in FIG. 29 would be formed by a permanent magnet (1). Its different components can be built (and coated) with whatever material is considered appropriate.

In the case of independent generators, all of the considerations contemplated for the case of ring-shaped ones that can be applied to them will have to be taken into account. Although their construction is simpler, the way they work is similar to those that have already been explained. We can especially mention two types:

a) Permanent Magnet Generators

Figure 29:
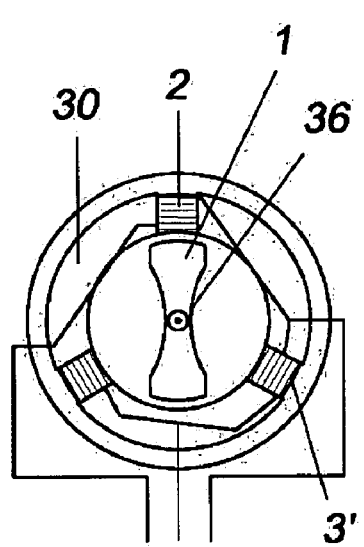
FIG. 29 represents an example of a non-watertight independent three-phase permanent magnet generator. (1) is the magnet, (2) the armature coils, with their cores (3), (30) the insulating material in which they have been embedded and (36) the rotor shaft.
Figure 30:
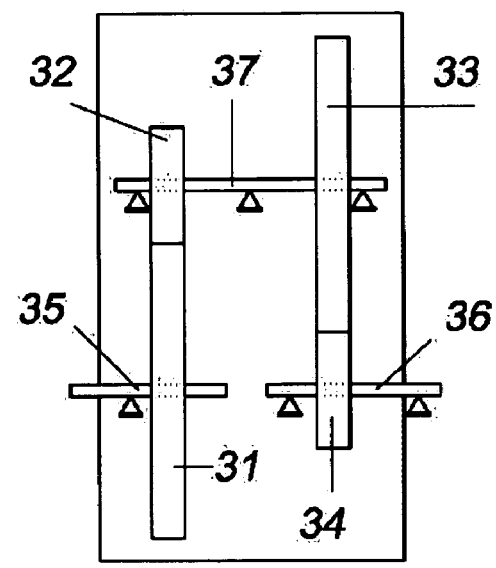
FIG. 30 represents the simplest possible example of a gearbox system. 31, 32, 33 and 34 represent gear wheels, (35) the rotor shaft of the turbine, (36) the rotor shaft of the generator and (37) the axle of the gear wheels 32 and 33.

FIG. 29 represents, by way of example, a three-phase permanent magnet generator that does not need to be watertight. The rotor is formed by a permanent magnet (1) that can rotate around a shaft (36). As the rotor turns, a variation in magnetic flux is produced in the coils (2), giving rise to an induced e.m.f. The armature is formed by a set of coils with cores of magnetizable material without residual magnetism and of high permeability, attached to a ring of a high permeability material, and without residual magnetism (for example a large number of very thin laminae of Fe—Si, insulated from each other and strongly compressed, or any other suitable means to minimize Foucault currents). Although in FIG. 29 a three-phase generator of projecting poles is represented, any other could be used with any number of poles.

Figure 48:
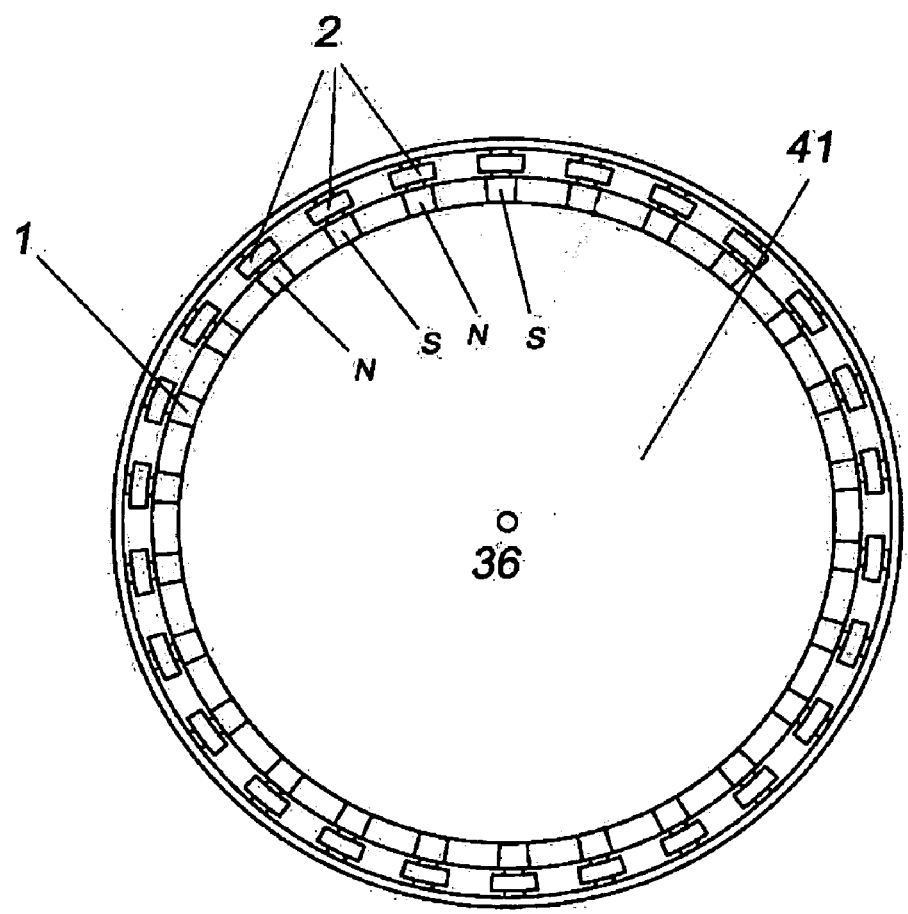
FIGS. 48, 49 and 50 represent examples of independent non-watertight permanent magnet generators installed in the form of a ring, in which (36) is the shaft and (41) the central area, the rotating disc or central structure.
Figure 49:
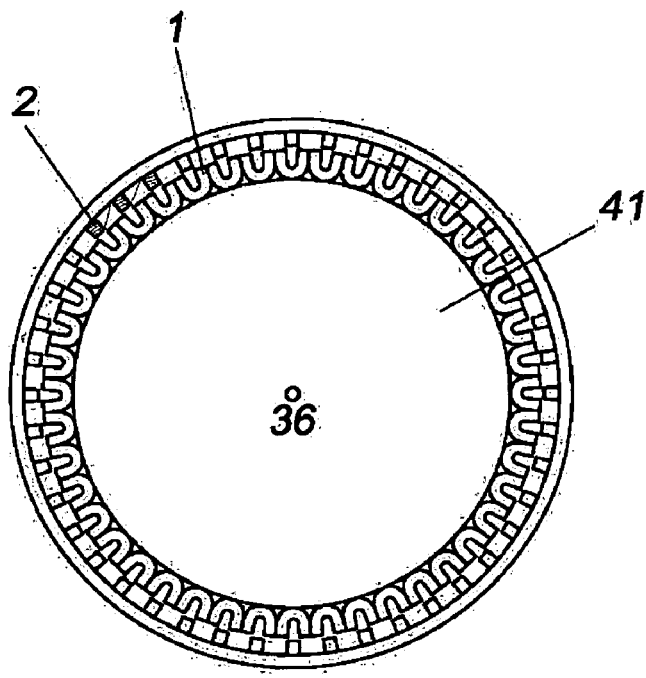
Figure 50:
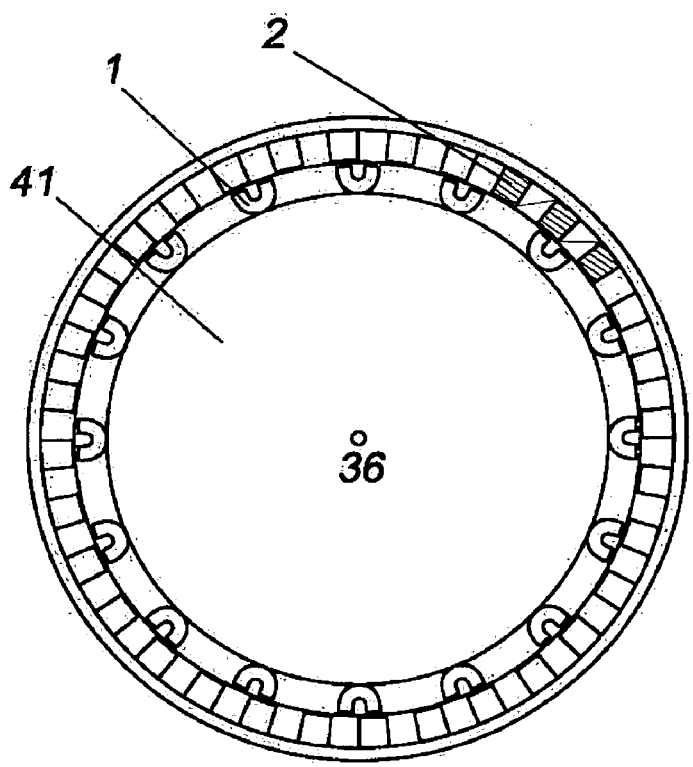

Also permanent magnet generators of the type of those installed in the form of a ring described previously but installed in an independent way, could be used with any prime mover, for which it will be necessary to place in the central area of the exciter-armature rings, a disc (41) of a suitable thickness (or a structure of braces) with its shaft (36), and around which the rings are fixed, as for example in FIGS. 48, 49 and 50.

The rotor of those generators is formed by a disc or structure that rotates around a shaft and to which the rings have been fixed, with a plurality of permanent magnets (whose number can be variable) fixed to them.

The stator is formed by a ring to which a plurality of coils with a core of a magnetizable material without residual magnetism and of high permeability (for example a core made up of a large number of very thin laminae of Fe—Si, insulated in between and strongly compressed) have been fixed.

The rotor magnets can be of different shapes, sizes and materials, and be placed in several ways, for example: a) Magnets installed longitudinally around the periphery of the ring with their north poles adjacent to each other and their south poles adjacent to each other, forming a multipolar ring, b) Magnets installed longitudinally around the ring and separated from each other, c) Bar-shaped magnets situated around the ring at a certain distance from each other, for example with alternating polarity, in such a way that if one magnet is joined to the ring by its N pole, the following is joined by its S pole, joined to each other by a material of high magnetic permeability, d) Magnets fixed transversally to the ring, etc.

In each one of the cases, the stator coils should be placed in an appropriate way on the ring, that is, in the cases of a), b) and c) longitudinally and of d) transversally.

b) Variable Reluctance Generator

Figure 31:
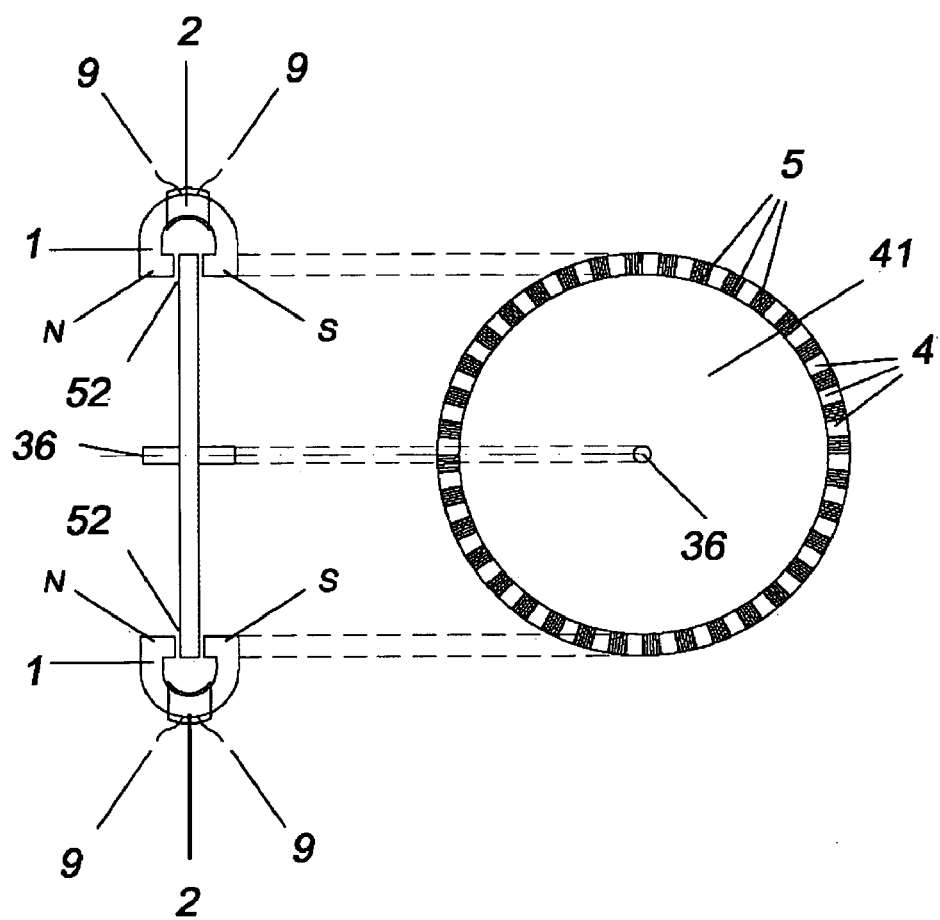
FIGS. 31, 32 and 33 represent examples of non-watertight independent variable reluctance generators.
Figure 32:
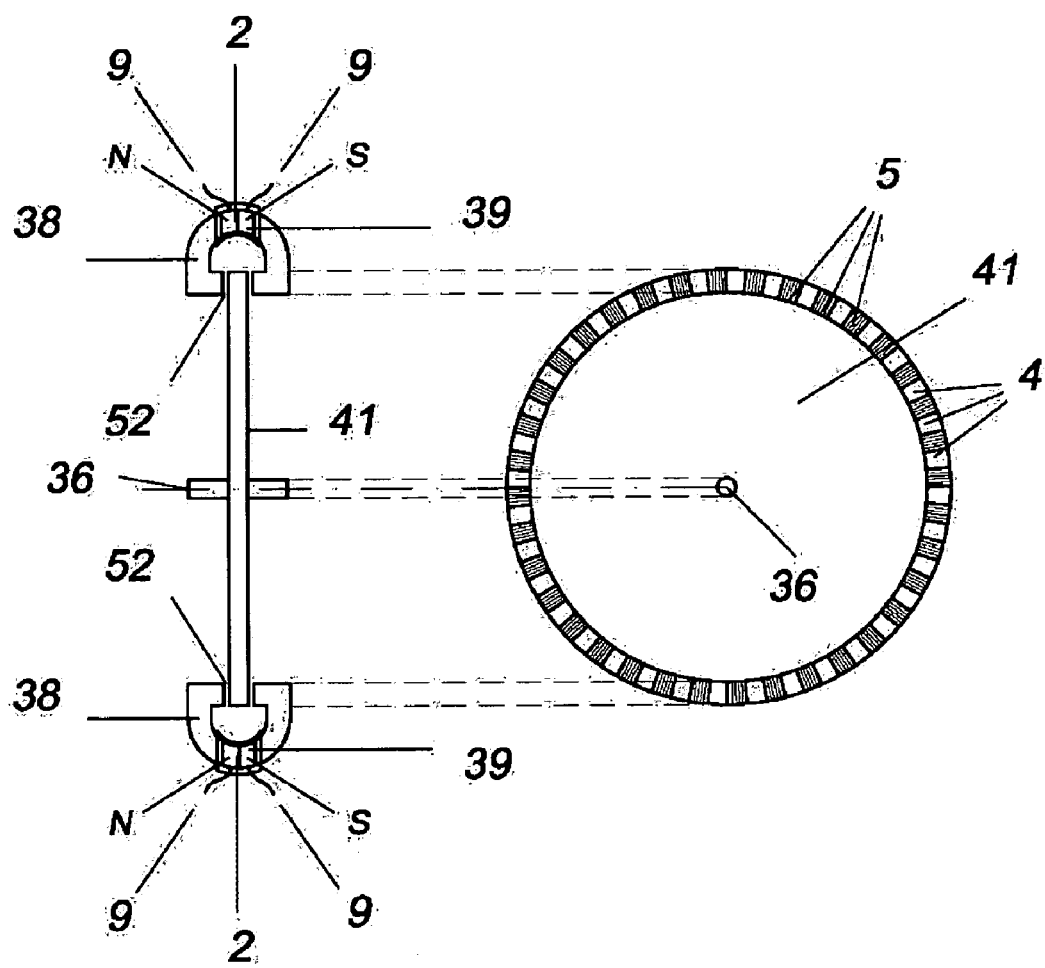
Figure 33:
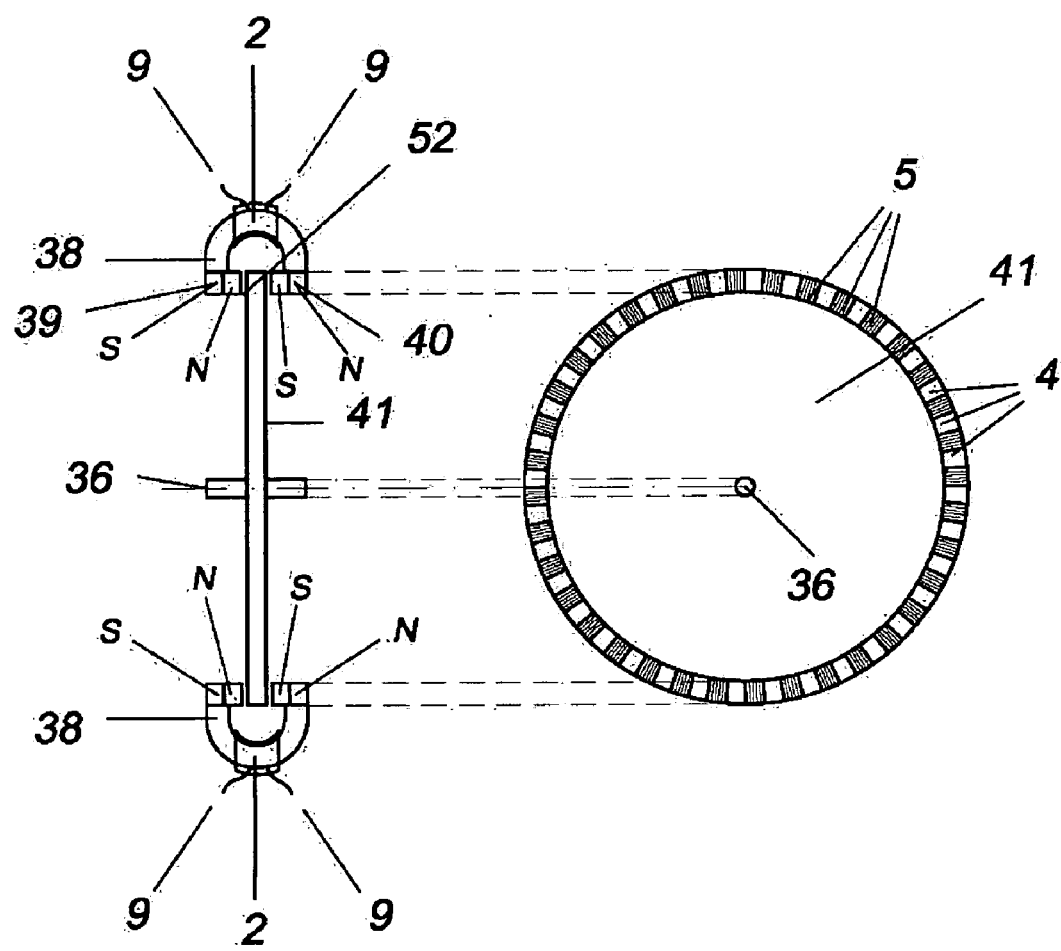

FIGS. 31, 32 and 33 represent practical examples for the realization of variable reluctance generators that can be used with any prime mover.

The rotor could be formed by a toothed wheel (which rotates around a shaft) of a non-magnetized material of high magnetic permeability, or better by a wheel of another material (preferably non-magnetizable and light so that the speed of rotation of the same is greater due to its lower mass) and on the periphery of which has been fixed a ring made up of alternating portions of low (4) (preferably of high diamagnetism) and high (5) magnetic permeability material (non-magnetized), or simply with teeth or portions (5) of high magnetic permeability, non-magnetized on its periphery and gaps. With the object of avoiding eddies being produced when turning, the gaps (4) between the teeth or portions (5) (the shape, thickness and dimensions of which can vary depending on the case) can be filled with a material of low magnetic permeability, preferably light (if using a material of great diamagnetism, the variation of flux will be greater). To minimize losses by Foucault currents, the teeth or portions of material of high magnetic permeability (5) are advisable to be formed by a great number of very thin laminae of the material, superimposed one on top of the other, insulated from each other and strongly compressed or by any other suitable means to minimize them.

The stator could be formed by a variable number of magnets (1), preferably in the shape of a horseshoe, although they can also be toroidal, or any other shape that is considered convenient, and in all cases with an air gap, forming the core for the winding of the armature coils (2). It is not essential that (38) is made up entirely of one magnet (1), it can be that the magnet or magnets are only in a specific area (39 in FIG. 32), and in any position along the length of the piece (38), the rest being simply made up of a high magnetic permeability material. Also, for example, two magnets (39 and 40) could be placed with opposing poles on either side of the air gap, as shown in FIG. 33.

When the rotor rotates, the portions of high (5) and low (4) magnetic permeability will pass the air gap of the magnet, generating an induced e.m.f. The stator magnets will preferably be installed alternating the polarity between adjacent pieces in order to keep the rotor centered as it rotates. Both the rotor as well as the stator can be embedded in a resistant, non-magnetizable material.

Variable reluctance generators have many advantages when compared with conventional generators and even with those of permanent magnets (both independent as well as those installed in the form of a ring). In addition to the advantages when compared with conventional ones of not having commutators or brushes and therefore not forming arcs or sparks in them, of being more silent, more efficient (in great part due to the elimination of the primary current), of heating less, etc., they also have advantages when compared with those of permanent magnets, in that as they do not have magnets on their rotor, they can be much lighter and with the same turbine the rotor can reach a higher speed, not producing complete inversion of the magnetic field, so losses in them by hysteresis and Foucault currents are lower, etc. In addition, the production and maintenance are cheaper than for those of permanent magnets, since in order to mount magnets with their fields in opposition it is necessary to overcome the magnetic forces, which causes their production on a large scale and their maintenance to be more costly.

For all the kinds of aforementioned independent generators, magnetoelectric and variable reluctance, both the rotor as well as the stator can be embedded in a solid ring of a resistant non-magnetizable material (for example a plastic material). The rotor ring is fixed to the disc or rotating structure and that of the stator to a suitable casing. The dimensions and materials from which the different elements are constructed can vary from one unit to another.

The same considerations mentioned before will have to be taken into account. In this case it is convenient that the shaft of the turbine or turbines and that of the generator be connected by means of a gearbox.

Materials to Use and Insulation

Whatever generators are used, the most important magnetic properties that the material employed for the magnets has to have are: high coercivity ($H_c$), retentivity ($B_r$) and maximum energy product ($B_d H_d$), for which suitable materials are available on the market, among which, only by way of example, several kinds of Alnico and Cunife, and diverse alloys of aluminium with carbon, etc. can be mentioned. As for the diamagnetic material, in the case of using it, it is convenient that it has a high diamagnetism (such as pyrolytic graphite, suitably insulated, for example).

Both the rotors as well as the stators with the coils of the armature should be protected by another type of material that prevents corrosion, the formation of small turbulences, and impedes the introduction of foreign substances.

The turbines and the C-shaped casings can be made of a strong light material, resistant to corrosion and the unfavourable conditions of the marine environment (for example fibreglass or carbon fiber, being best if it is reinforced, for example with epoxy, or even better reinforced PEEK, aluminium or aluminium alloy, double-walled with polystyrene in between and antifouling protection, etc.). Depending on the type of material chosen, it might be convenient to have mixed or in its composition, some type of material that provides buoyancy.

All of the elements of the system that are not or cannot be made of a carbon fiber type of material, or another of similar properties, and depending if the type of material needs it, should be coated with a material of a low coefficient of friction, with non-stick characteristics (to prevent biofouling) and that protects them from corrosion (for example a fluoroplastic, a material of the Teflon type, etc.). This is especially applicable to all the metallic elements of the system, which should be so protected and, in addition, should not come into direct contact with the carbon fiber to avoid galvanic corrosion. To reduce friction in the areas which need it, Teflon® PTFE grease could be used, for example, or another substance of similar characteristics.

Given the low temperatures in marine waters, in general no refrigerant for the armature coils will be necessary, the sea water itself performing this function.

Installation and Maintenance

Any of these devices could be installed in many ways, for example anchored directly to the seabed or hanging from a bridge or anchored platforms, floating or not, which has the additional advantage of allowing them to be raised for maintenance. Small sized units could also be installed in any type of vessel.

It would also be advisable that they had a system which allowed their orientation to be changed in the case of variable currents (to correct for seasonal changes, etc.). They could be provided with a dynamic positioning system that allows varying their orientation, depth and position. When installed suspended from bridges or platforms, floating or not, these could have a system that allowed their rotation and a change of the depth at which they are submerged. When anchored to the seabed, the system of orientation and the system of rotation could be submerged and have for example a crown of orientation or dynamic positioning, even being able to be controlled by remote control from terra firma, or from a platform, a boat or similar that may be incidentally moved to the area when considered necessary. It is also advisable that they have a flotation system that allows their raising for repairs and maintenance.

It will be convenient to install them anchored to the seabed if they are located close to the coast and with bottoms of relatively little depth. If they are installed in areas of greater depth and far from the coast, it is preferable to do it by suspending them from suitable platforms, which are advisable to have an appropriate means to allow their raising and maintenance. In these locations very far from the coast, on the high seas, there is no inconvenience to transport the electrical energy to land by means of undersea cables, but if it is wished to use it for the desalination of water or to obtain hydrogen from sea water, it is more convenient to generate it close to the coast, and transport it to land by means of pipelines, that are advisable to be as short as possible. As platforms even the structures of old oil platforms that had been left disused could be used.

If anchored to the seabed, the nozzle itself can be anchored, and a sector acting as a cover bolted to the same with dimensions corresponding to the turbine-generator set be mounted on its upper part, in the area of the critical section, the object being to allow for the raising of said set without the need to operate on the nozzle, thus making maintenance work easier. In the case of open-center turbines, if the cylinder (or the ring or system of rings with braces, depending on the case) inside the drum, is filled with a low density material as previously proposed, that would improve its buoyancy, and less additional flotation systems would be required. To facilitate its raising, it can have as well, some rings or cables or chains or an equivalent system on the upper area of the part of the system that is to be raised (or where it is considered more convenient depending on the particular geometry in each case and the size of the system). It is advisable that the system of fixing of the cylinder, or ring, or system of rings with braces can be connected and disconnected by remote control (and/or by means of robots), in such a way that when one wants to proceed with the maintenance it can be released and the floats make the turbine-generator sets come up to the surface. In order to submerge them again afterwards, they may be hooked to ballast taking them back to the bottom, which could be disconnected once connected to its permanent anchorage, if appropriate. Another possibility would be to hook them to a kind of closed chain such that once on the surface, drawing from the other end, they can be taken again to their place. A system of magnets or electromagnets could aid in their connection and/or disconnection.

It is especially necessary to mention that in the case of large units and especially with open-center reel-shaped turbines, it is advisable that the inside of the cylinder be hollow and closed at both ends, for example with double doors of the type of those on submarines, maintaining air on the inside. In this way, and with a "tube" of sufficient size, their inside could be entered for maintenance, making incidental repairs much easier. If the fixed inner system were a ring or system of rings, it is convenient that they have a system that easily allows their extraction complete or in sections (for example by remote control and/or by means of robots) and their flotation for maintenance.

The nozzles may have "covers" on the area of the critical section and/or "covers" in the specific areas where the stators are, so that, opening these (by remote control, or by means of divers and/or robots), the turbine-generator groups and/or stators can be extracted either complete or in sections, according to the case, for their repair and/or substitution. With this object, a system of floats may be provided, and/or a system of cables or similar that facilitate its raising and flotation. The inner cylinders or fixed components may likewise have covers or a similar system that allows extracting the stators of the same from the inside.

To facilitate the maintenance of the stators, in case they are joined to or embedded in the walls of the nozzle in the area of its critical section, it would be advisable that these have some kind of cover in the areas of the critical section where the arcs or ring sectors of stators are installed so that, by opening them, those can be easily extracted. Both the opening as well as the extraction could even be done from the surface, by remote control and/or by means of robots, being in general more convenient to simply substitute a complete sector of ring of the stator, and to repair the damaged one on the surface or on terra firma if it is considered convenient. The same system could be applied to the inner ring stators, having in this case for example, for each ring, some covers of the dimensions of at least one sector of the ring, installed on the inner cylinder, (the ring, for example, could be made of joined sectors of rings to make their extraction and substitution easy), or otherwise in the case of having a system of rings with braces, to make them in such a way that the rings are extractable individually from the set (for one of several pieces).

General Considerations

Depending on the diameter of the drums, greater or lesser amounts of energy can be obtained from each unit. Nevertheless, it is convenient to use them in groups, in which case the "ocean submerged hydroelectric power station" would be formed by a large number of these grouped in a determined area, that could be controlled from dry land. When installing them it is necessary to leave sufficient separation between the different units, to avoid the wake of any of the turbines interacting with the others.

As the rotation of these turbines will be slow since the speed of marine currents rarely exceeds 4.5 knots, and moreover the magnetic fields from the magnets are of a small value and very concentrated in the magnetic circuits, these systems do not present any danger for the fauna or flora of the surroundings. Neither do they produce any type of contamination.

If it is wished to augment the speed of turn of the turbine in order to increase the power, in addition to installing them in the area of the critical section of a convergent-divergent nozzle of an adequate size for the turbine, they can also be located in natural narrows where the water acquires a greater speed in a natural way.

In the case of utilizing one of the variable reluctance types of generators, the placing of the material of low magnetic permeability between the teeth of the wheel or on the rotating ring (depending on the case), in addition to avoiding turbulences being produced, makes the variation in flux greater, especially if the material used is a material of elevated diamagnetism.

These systems should have all the electrical, electronic, hydraulic, pneumatic, etc. elements necessary as well as the required installation systems.

For the cases in which the shape of the obtained wave is not alternating, it will be necessary to add a system for transforming the obtained current into alternating. In all of the cases it is necessary to add a suitably insulated step-up transformer, for transporting the obtained electrical energy to terra firma where it can be connected to the electrical grid and taken to its place of use. All of this not dismissing using the obtained electrical energy directly in its place of generation for other possible uses.

Of all the different systems for obtaining electrical energy from marine currents described here, in principle the most resistant and most suitable in general would be the open-center axial turbine for higher current speeds, and the open-center curved-blade turbine with a convergent-divergent nozzle of an appropriate shape and dimensions for the size of the turbine for lower current speeds, both with a ring-shaped variable reluctance generator. The main advantage is that, due to the nozzle, greater power can be obtained for units of lesser size, being more profitable (above all in the places where the speed of the current is not very fast). Even though the nozzle entails a greater initial outlay for its installation, the fact that smaller turbines can be used makes it profitable. It is necessary to take into account that, once installed they do not require any expenditure on fuel so that the electrical energy obtained would be truly economical. In addition, the nozzle would be the only really profitable possibility for locations with lower speeds of water currents.

Utilization

This type of system can be used to obtain electrical energy not only from marine and river currents, but also for any case where a relative movement of the system is produced with regard to any fluid that makes the turbine rotate and with that the generator.

Another possible use of this equipment would be to use the generated electrical energy to obtain hydrogen and oxygen from water. In order to do that, the current obtained could be used to cause the electrolysis of water. Both could be used in situ or stored for future use and the hydrogen could be used as a fuel. The obtained hydrogen could be used directly, liquefied, sent overland by means of gas pipelines or another method, or stored in its place of obtention, having a possible refuelling station there for vehicles (marine or river, for example) that can use it as a fuel. If units of a small size are installed, that can be placed in the middle of the current from the hulls of boats, submarines, bathyscaphs (for which it could be very useful, for example, the oxygen generated from the electrolysis of water) or any kind of marine vehicle, we will be able to use it as an auxiliary source of energy. In order to do that the vehicle should have a suitable system to place it in an appropriate position and direction in the middle of the marine current, from which energy could be obtained. The equipment could be located in a compartment close to the hull, which would be opened when needed for use to be taken out on the outside and placed in the middle of the current. It should have a system of orientation and a dynamic positioning system of rotation that allowed changing its orientation and fixing it at a determined angle and distance. This type of installation and use can also be done with any type of non-watertight magnetoelectric or variable reluctance generator, any type of turbine, with or without nozzle.

It could also be used for the desalination of sea water.

If it was used to obtain hydrogen for use as a fuel for marine or river vehicles, it would reduce a lot the cost of transport for marine and river routes, since hydrogen is possibly the most important energy source of the future, and one of the biggest difficulties and which raises the price the most, are the processes of compression and liquefaction for its transport, and conveyance to the place of consumption. Therefore, combining both technologies (turbine-generator units such as those mentioned, with the obtaining of hydrogen), energy would be obtained at most competitive prices, which would bring great benefits.

Even though the invention has been described with reference to one preferred form and embodiment, it is obvious that it is not in any way limited, and that modifications are possible, in particular of shape, dimensions, materials, possible protective coatings and specific geometry of each one of the elements of the system, of the type of fluid with which it is used, of the way and place of installation, and of the utilization and distribution of the obtained energy (whatever may be the cause that provokes the turning of the turbine), without departing from the spirit or scope of the invention.

What is being claimed is:

1. Electric power generating system using ring-shaped generators, which comprises:
    at least one stator formed of, at least one ring sector (8, 16) that has first stator elements (100) fixed to it, each stator element (100) comprising:
        one piece of high magnetic permeability formed, at least partially, by at least one magnet;
        a winding (2) around the piece of high magnetic permeability;
        an air gap (52) formed in the piece of high magnetic permeability;
    at least one rotor (14) formed by at least one ring sector attached to a turbine, a ring sector to which is fixed at least one portion of high magnetic permeability (5) arranged alternately with at least one portion of low magnetic permeability (4);
wherein the rotation of the rotor (14) causes the portions of high (5) and low (4) magnetic permeability of the rotor to alternately pass the air gap (52) of each element of the stator (100), causing a variation of reluctance in the magnetic circuit formed by each stator element (100), and the portions of high (5) and low (4) magnetic permeability of the rotor (14), and inducing an e.m.f. in each one of the windings (2) of the stator elements (100).

2. Electric power generating system using ring-shaped generators according to claim 1, wherein each piece of high magnetic permeability (1) of the stator elements (100) in its totality is constituted by one magnet.

3. Electric power generating system using ring-shaped generators according to claim 1, wherein the portions of low magnetic permeability (4) of the rotor (14) are gaps.

4. Electric power generating system using ring-shaped generators according to claim 1, wherein the portions of high magnetic permeability (5) of the rotor (14) are ferromagnetic.

5. Electric power generating system using ring-shaped generators according to claim 1, wherein the turbine comprises magnetic bearings formed by "spacer" magnets or electromagnets.

6. Electric power generating system using ring-shaped generators according to claim 1, wherein the rotor and/or the stator are embedded in a resistant, non-magnetizable material filling the spaces between their elements.

7. Electric power generating system using ring-shaped generators according to claim 1, wherein at least one rotor (14) is fixed to the area of greatest radius (10) and/or of least radius (17) of the turbine.

8. Electric power generating system using ring-shaped generators according to claim 1, wherein the turbine belongs to one of the following types: axial, radial, open-center axial, open-center radial, in the form of a reel, a paddle wheel, cycloidal.

9. Electric power generating system using ring-shaped generators according to claim 1, wherein the blades of the turbine belong to one of the following types: curved blade, flat blade, articulated blade, paddle, scoop.

10. Electric power generating system using ring-shaped generators according to claim 1, which is incorporated in a nozzle (22).

11. Electric power generating system using ring-shaped generators according to claim 9, wherein the nozzle (22) comprises at least one cover.

12. Electric power generating system using ring-shaped generators according to claim 1, which additionally comprises a casing with the shape of a pseudo-ring with a C-shaped section.

13. Electric power generating system using ring-shaped generators according to claim 1, which incorporates a material of low density in at least one of the following elements: the center of the turbine, the blades of the turbine, the casing.

14. Electric power generating system using ring-shaped generators according to claim 1, which is additionally installed according to one of the following ways: floating, anchored to the bottom, fixed to a vessel, hanging from a bridge, suspended from a platform.

15. Electric power generating system using ring-shaped generators according to claim 1, which additionally comprises at least one of the following coatings: non-stick, anti-corrosion, antifouling.

16. Electric power generating system using ring-shaped generators which comprises:
    at least one stator formed by, at least one ring sector (8, 16) that has second stator elements (101) fixed to it, each stator element (101) comprising at least one winding (2) wound around a piece of high magnetic permeability and without residual magnetism;
    at least one rotor (14) formed by at least one ring sector attached to a turbine, at least one magnet (1) being fixed to said ring sector;
wherein the rotation of the rotor (14) causes the magnets (1) of the rotor (14) to pass in front of the stator coils, causing a variation in the magnetic flux going through said stator coils and inducing an e.m.f. in each one of the windings (2) of the second stator elements (101).

* * * * *